(12) United States Patent
Muraki

(10) Patent No.: US 8,732,809 B2
(45) Date of Patent: May 20, 2014

(54) SYSTEM, SERVER DEVICE, METHOD, PROGRAM, AND RECORDING MEDIUM THAT ENABLE FACILITATION OF USER AUTHENTICATION

(76) Inventor: Hirokazu Muraki, Yokohama (JP)

( * ) Notice: Subject to any disclaimer, the term of this patent is extended or adjusted under 35 U.S.C. 154(b) by 190 days.

(21) Appl. No.: 13/142,017

(22) PCT Filed: Dec. 29, 2008

(86) PCT No.: PCT/JP2008/004043
§ 371 (c)(1),
(2), (4) Date: Dec. 13, 2011

(87) PCT Pub. No.: WO2010/076840
PCT Pub. Date: Jul. 8, 2010

(65) Prior Publication Data
US 2012/0102558 A1    Apr. 26, 2012

(51) Int. Cl.
*H04L 29/08* (2006.01)

(52) U.S. Cl.
USPC ............................ 726/7; 713/168; 713/193

(58) Field of Classification Search
CPC ............................... G06F 21/31; H04L 63/08
USPC ............................................................. 726/7
See application file for complete search history.

(56) References Cited

U.S. PATENT DOCUMENTS 5,560,008 A * 9/1996 Johnson et al. ................... 726/5
6,223,291 B1 * 4/2001 Puhl et al. ....................... 726/28
2002/0183985 A1 * 12/2002 Hori et al. ......................... 703/1
2003/0093678 A1 * 5/2003 Bowe et al. .................... 713/180
2007/0025704 A1 * 2/2007 Tsukazaki et al. .............. 386/96
2007/0027812 A1 * 2/2007 Ogawa et al. ................... 705/57
2009/0015857 A1 * 1/2009 Tsurumi ...................... 358/1.14

FOREIGN PATENT DOCUMENTS

WO    2007089045 A1    8/2007

OTHER PUBLICATIONS

International Preliminary Report on Patentability issued in corresponding PCT Application No. PCT/JP2008/004043 dated Aug. 16, 2011.
English translation of Notice of Reasons for Refusal issued in corresponding Japanese Patent Application No. 2010-544845 dated Aug. 27, 2013.

* cited by examiner

*Primary Examiner* — Mohammad L Rahman
(74) *Attorney, Agent, or Firm* — MKG, LLC

(57) ABSTRACT

A terminal device acquires item property information from a medium, and transmits, to a server device, terminal identification information of the terminal device, which is assigned by the server device in advance and stored in storage means and item property information acquired from the medium. The server device stores the terminal identification information and the item property information received from the terminal device, and transmits, to a device, information generated based on the terminal identification information and the item property information received from the terminal device. The server device performs authentication of a user of the terminal device based on the terminal identification information. Because this terminal identification information is assigned by the server device, transmission of the information does not entail a risk of leakage of personal information, unlike a case in which personal information such as a telephone number is used for authentication.

30 Claims, 11 Drawing Sheets

FIG. 2

| Terminal ID | Company ID | Service ID | Name of Contents | Period of Validity |
|---|---|---|---|---|
| 24273873 | 2361 | 120183 | The Tale of a Kitten | from November 15, 2008 to December 25, 2008 |
| 42832315 | 1324 | 726937 | New Year Music Concert, Year 2008-2009 | on December 31, 2008 |
| : | : | : | : | : |
| : | : | : | : | : |

FIG. 11

SYSTEM, SERVER DEVICE, METHOD, PROGRAM, AND RECORDING MEDIUM THAT ENABLE FACILITATION OF USER AUTHENTICATION

TECHNICAL FIELD

The present invention relates to a technology that facilitates user authentication required for provision of various services by use of data communication via networks.

BACKGROUND ART

As a result of an increase in use of Internet and mobile communication systems, a large number of people now use a variety of services provided by e-commerce sites via networks, such as music data distribution and merchandise retailing services. When providers of such services (hereinafter referred to as "service providers") need to identify an individual user of the services (hereinafter referred to as a "service user"), the service user has to be authenticated in some way.

One of the most common ways to perform user authentication is to check a combination of user identification and password. According to such a method, a service user transmits from his/her terminal device his/her user identification and his/her password, which have been provided by a service provider and are unique to the service user, to a server device managed by the service provider. When a combination of user identification and password is transmitted from the terminal device verification is carried out at the server device of the service provider by reference to a combination of user identification and password pre-registered in the server device. When the verification is successfully executed, the server device of the service provider determines that the service user using the terminal device is authenticated as a service user.

In a service of providing, for example, music data, after user authentication is successfully executed, distribution of music data from the server device of the service provider to the terminal device of the service user is started. Similarly, in a transaction of purchasing merchandise from an e-commerce site, after user authentication is successfully executed, the service provider can arrange shipping of purchased merchandise to a postal address designated by the service user.

SUMMARY OF INVENTION

Technical Problem

The authentication method described above suffers from a drawback in that each time a service user wishes to use a service the user is required to input into his/her terminal device each of user identification and password.

To solve the foregoing problem, the present invention is aimed to provide means to simplify user authentication required for provision of services via networks.

Solution to Problem

In a first embodiment of the present invention, a system is provided comprising:
a medium, a terminal device, and a server device,
wherein
the medium holds an item attribute data set indicating one or more attributes of an item and identifying the item,
the terminal device has:
a receiving unit that receives from the server device a terminal identification data set identifying the terminal device,
a storing unit that stores the terminal identification data set received by the receiving unit,
an obtaining unit that obtains from the medium the item attribute data set held by the medium, and
a transmitting unit that transmits the terminal identification data set stored by the storing unit and the item attribute data set obtained by the obtaining unit to the server device, and
the server device has:
a receiving unit that receives the terminal identification data set and the item attribute data set transmitted from the terminal device,
a storing unit that stores the terminal identification data set and the item attribute data set received by the receiving unit in association with each other, and
a transmitting unit that transmits to the terminal device the terminal identification data set identifying the terminal device, and
the transmitting unit of the server device transmits to a first device the terminal identification data set and at least a part of the item attribute data set received by the receiving unit, or a data set generated from the terminal identification data set and at least a part of the item attribute data set received by the receiving unit.

In accordance with the first embodiment, for example, the following e-commerce system is realized. Namely, the first device is a Web server providing an e-commerce site, and when a service user performs an operation using his/her terminal device to obtain an item attribute data set from a medium, after user authentication of the service user is successfully executed at the server device based on the terminal identification data set of the terminal device, the server device transmits to the Web server details of shipping of merchandise to the service user. According to this system, a terminal identification data set permanently assigned to the terminal device, such as an identification data set permanently stored in the terminal device from the time the terminal device is manufactured, or a telephone number assigned to the terminal device having a mobile phone function, is not used for authenticating a service user, and the terminal identification data set assigned by and transmitted from the server device is used for the authentication. Accordingly, there is no risk that personal information of the user, such as a telephone number, is leaked to an unintended recipient.

In a second embodiment of the present invention, a system according to the first embodiment is provided, wherein:
the receiving unit of the server device receives a response data set transmitted from the first device in response to the transmission of data made by the transmitting unit of the server device, and
the transmitting unit of the server device transmits a predetermined data set corresponding to the response data set received by the receiving unit of the server device to a second device that is different from the first device.

In accordance with the second embodiment, for example, the following content distribution system is realized. Namely, the first device is a payment server and the second device is a content distribution server, and after authentication of a service user is successfully executed at the server device based on the terminal identification data set, payment processing for the service user is executed by the payment server. After the server device receives a response data set indicating that the payment processing is completed, the server device transmits to the content distribution server an instruction to distribute a requested content data set to a service user's terminal device.

In a third embodiment of the present invention, a system according to the first or second embodiment is provided, wherein:

the medium is a device that has a receiving unit receiving data from the server device, and the first device is the medium.

In accordance with the third embodiment, for example, the following content distribution system is realized. Namely, the server device functions as a content distribution server and the first device is a Personal Computer (PC) of the service user that functions as a medium displaying the item distribution data set on its display unit, and after authentication of the service user is executed successfully at the server device, the server device distributes a requested content data set to the PC.

In a fourth embodiment of the present invention, a system according to the second embodiment is provided, wherein:

the medium is a device that has a receiving unit receiving data from the server device, and the second device is the medium.

In accordance with the fourth embodiment, for example, the following content distribution system is realized. Namely, the server device functions as a content distribution server, the first device is a payment server and the second device is a service user's PC that functions as a medium displaying the item attribute data set on its display unit, and after authentication of the service user is successfully executed at the server device and payment processing is completed by the payment server, the server device transmits a requested content data set to the PC.

In a fifth embodiment of the present invention, a system according to the first or second embodiment is provided, wherein:

the item attribute data set contains a device identification data set identifying the first device, and the transmitting unit of the server device transmits data to the first device identified by the device identification data set contained in the item attribute data set.

In accordance with the fifth embodiment, the server device can specify the first device as a destination of data transmission based on the device identification data set contained in the item attribute data set held by the medium. Accordingly, for example, the service user is not required to input into his/her terminal device the device identification data set of the first device and transmit it to the server device.

In a sixth embodiment of the present invention, a system according to the second embodiment is provided, wherein:

the item attribute data set contains a device identification data set identifying the second device, and the transmitting unit of the server device transmits data to the second device identified by the device identification data set contained in the item attribute data set.

In accordance with the sixth embodiment, the server device can specify the second device as a destination of data transmission based on the device identification data set contained in the item attribute data set held by the medium. Accordingly, for example, the service user is not required to input into his/her terminal device the device identification data set of the second device and transmit it to the server device.

In a seventh embodiment of the present invention, a system according to the first or second embodiment is provided, wherein:

the first device is the terminal device.

In an eighth embodiment of the present invention, a system according to the second embodiment is provided, wherein:

the second device is the terminal device.

In accordance with the seventh or eighth embodiment, for example, the following discount ticket distribution system is realized. Namely, the medium is, for example, a paper medium on which advertisements and image codes indicating item attribute data sets of commercial goods or services are printed, and when the service user wishes to obtain a discount ticket that discounts a price of commercial goods or services, the service user is only required to scan the image code by use of a built-in camera function of his/her terminal device. The item attribute data set indicated by the image code is transmitted from the terminal device to the server device, and after successful authentication of the service user at the server device, an image data set indicating a discount ticket is transmitted to the terminal device and the terminal device displays the discount ticket on its display unit.

In a ninth embodiment of the present invention, a system according to any one of the first to eighth embodiments is provided, wherein:

the storing unit of the server device stores a point data set with respect to each of a number of terminal identification data sets that may be received by the receiving unit of the server device, the point data set indicating a number of points, and the server device has a point changing unit that causes the storing unit of the server device to change the point data set with respect to the terminal device, when the receiving unit of the server device receives the terminal identification data set and the item attribute data set from the terminal device, so that the point data set with respect to the terminal device indicates an adjusted number of points, increased or decreased in accordance with the item attribute data set.

In accordance with the ninth embodiment, for example, the following reward program system is realized. Namely, when the service user buys something at a shop participating in the reward program, s/he can obtain and use reward points that are awarded in accordance with the purchased amount and can be used for discounting the cost of a future purchase at any shop participating in the reward program simply by scanning an image code indicating the item attribute data set that is printed on a receipt by a cash register of the shop using his/her terminal device. The item attribute data set indicated by the image code is transmitted from the terminal device to the server device, and after successful authentication of the service user at the server device, the service user's reward points are increased or decreased in accordance with the item attribute data set at the server device.

In a tenth embodiment of the present invention, a system according to any one of the first to ninth embodiments is provided, wherein:

the storing unit of the server device stores a condition data set indicating a condition applied to the item attribute data set, the server device has a determining unit that determines, when the receiving unit of the server device receives the terminal identification data set and the item attribute data set from the terminal device, whether the item attribute data set meets the condition indicated by the condition data set stored by the storing unit of the server device, and the transmitting unit of the server device transmits data to the first device only when the determining unit of the server device determines that the item attribute data set meets the condition.

In accordance with the tenth embodiment, for example, the following content distribution system is realized. Namely, when the service user buys a movie DVD using a ticket to obtain special content related to the movie within a certain limited time, the service user can obtain the special content simply by scanning an image code indicating the item attribute data set that is printed on the package of movie DVD by use of his/her terminal device. The item attribute data set indicated by the image code is transmitted from the terminal device to the server device, and after authentication of the service user is successfully executed by the server device, the server device determines whether a condition for distributing the special content is met based on the item attribute data set and the current time. When the server device determines that the condition is met, the server device instructs the first device, which functions as a distribution server, to distribute a content data set of the special content to a PC of the service user.

In an eleventh embodiment of the present invention, a system according to the tenth embodiment is provided, wherein:

the storing unit of the server device stores the condition data set indicating a condition applied to the item attribute data set received previously by the receiving unit of the server device and stored in the storing unit of the server device.

In accordance with the eleventh embodiment, for example, the following discount ticket distribution system is realized. Namely, under a condition that a discount ticket is given to a service user only when s/he purchases each of two different specified items, the service user can obtain the discount ticket simply by scanning an image code indicating the item attribute data set printed on a package of each of the items, at different timings. When a first item is purchased and the image code on a package of the first item is shot by the service user using his/her terminal device, the item attribute data set of the first item is stored at the server device, and when the second item is purchased and the image code on a package of the second item is shot by the camera, the server device determines that a condition for issuing the discount ticket is met based on the stored item attribute data set and the newly received item attribute data set, and transmits an image data set indicating the discount ticket to the terminal device.

In a twelfth embodiment of the present invention, a system according to any one of the first to eleventh embodiments is provided, wherein:

the medium is a medium on which an image indicating the item attribute data set is formed, or a device that displays an image indicating the item attribute data set, and the obtaining unit of the terminal device optically reads the image shown by the medium to obtain the item attribute data set.

In accordance with the twelfth embodiment, the foregoing systems can be realized by utilizing a device with a display unit for displaying images or any medium on which images can be formed such as a piece of paper as the medium holding the item attribute data set.

In a thirteenth embodiment of the present invention, a system according to any one of the first to eleventh embodiments is provided, wherein:

the medium transmits any one of sound signals, radio signals, electric signals, optical signals and magnetic signals indicating the item attribute data set, and the obtaining unit of the terminal device receives the any one of sound signals, radio signals, electric signals, optical signals and magnetic signals directly from the medium to obtain the item attribute data set.

In accordance with the thirteenth embodiment, the foregoing systems can be realized by utilizing a device with a unit for transmitting signals such as sound signals as the medium holding the item attribute data set.

In a fourteenth embodiment of the present invention, a system according to any one of the first to thirteenth embodiments is provided, wherein:

the server device has a code generating unit that generates a code indicating the item attribute data set in a form of an image or signals, and the medium holds the item attribute data set in a form of the image or the signals generated by the code generating unit of the server device.

In accordance with the fourteenth embodiment, codes indicating item attribute data sets are generated by the server device. Accordingly, in comparison with a case where codes are generated by each of various devices other than the server device, the item attribute data sets are managed easily by the server device.

In a fifteenth embodiment of the present invention, a system according to the fourteenth embodiment is provided, wherein:

the receiving unit of the server device receives a code request from the first device, the code generating unit of the server device generates the code in response to the code request received by the receiving unit of the server device, the transmitting unit of the server device transmits the code generated by the code generating unit of the server device to the first device, and the medium is a device that has a code receiving unit receiving the code from the first device.

In accordance with the fifteenth embodiment, for example, the following e-commerce system is realized. Namely, the first device functions as a Web server providing an e-commerce site and the medium is a PC of the service user purchasing items using the e-commerce site, and when the service user operates his/her PC to select a certain item to be purchased using the e-commerce site, the PC transmits to the server device a code request containing an item identification data set identifying the selected item. In response to the code request, the server device transmits to the Web server of the e-commerce site an image code indicating the item attribute data set containing the item identification data set. Then, the Web server of the e-commerce site transmits the image code to the PC and the PC displays the image code on its display unit.

In a sixteenth embodiment of the present invention, a system according to the fourteenth embodiment is provided, wherein:

the medium is a device that has a code receiving unit receiving the code from the server device, and the transmitting unit of the server device transmits the code generated by the code generating unit to the medium.

In accordance with the sixteenth embodiment, for example, the following e-commerce system is realized. Namely, the server device functions as a Web server of an e-commerce site and the medium is a PC used by the service user to access the e-commerce site to select items to be purchased, and when the service user operates his/her PC to select a certain item to be purchased from the e-commerce site, the server device generates an image code indicating the item attribute data set containing an item identification data set identifying the selected item and transmits the image code to the PC. The PC receives the image code from the server device and displays the image code on its display unit.

In a seventeenth embodiment of the present invention, a system according to any one of the first to sixteenth embodiments is provided, wherein:

the storing unit of the server device stores an authentication data set with respect to each of a number of terminal identification data sets that may be received by the receiving unit of the server device, the authentication data set being used for authenticating a user of a terminal device identified by the terminal identification data set corresponding to the authentication data set, the receiving unit of the server device receives from an arbitrary device an authentication data set for authenticating a user of the arbitrary device, the server device has a terminal identification changing unit that, when the authentication data set received by the receiving unit of the server device is verified to correspond to one of the authentication data sets stored by the storing unit of the server device, and when the terminal identification data set stored with respect to the verified authentication data set by the storing unit of the server device is named as a first terminal identification data set, assigns to the first terminal identification data set a second terminal identification data set that is different from the first terminal identification data set, and instructs the storing unit of the server device to store data that was stored in association with the first terminal identification data set in association with the second terminal identification data set, and the transmitting unit of the server device transmits the second terminal identification data set to the arbitrary device in response to an instruction from the terminal identification changing unit.

In accordance with the seventeenth embodiment, for example, when the service user changes his/her terminal device, s/he can update the registration of his/her terminal device at the server device only by operating his/her new terminal device to transmit to the server device an authentication data set that was transmitted from the server device to the old terminal device and noted by the service user. When the server device receives the authentication data set from the new terminal device, the server device associates the new terminal device with the data stored in association with the old terminal device.

In any one of the above-described systems, terminal identification data sets identifying terminal devices that obtained item attribute data sets and item attribute data sets obtained by the terminal devices are recorded as log data sets at the server device. Accordingly, for example, the log data sets may be transmitted from the server device to a device of a service provider, such as an administrator of an e-commerce site or content distribution site, or an advertising provider, and utilized for marketing analysis, etc.

The present invention also provides methods that are executed by the above-mentioned systems, server devices configuring the above-mentioned systems, programs causing a computer to execute processes of the server devices, and recording media for recording the programs that can be read by a computer.

Advantageous Effects of Invention

According to the present invention, a server user can use a service via networks requiring user authentication simply by operating his/her terminal device to obtain an item attribute data set held by a medium.

BRIEF DESCRIPTION OF DRAWINGS

FIG. 2 illustrates an exemplary structure of data sets stored in a storing unit of a management server in the reward program system of the first example of the present invention.

FIG. 11 illustrates an exemplary structure of data in a permission database in a modified example of the present invention.

REFERENCE SIGNS LIST

Figure 1:
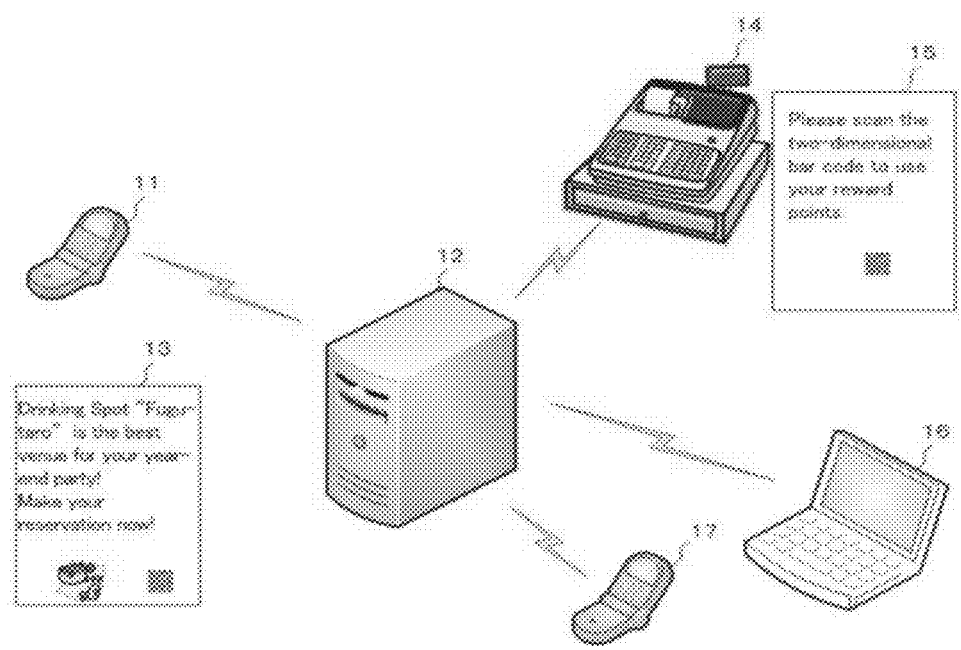
FIG. 1 illustrates an overall configuration of a reward program system of the first example of the present invention.

1: reward program system
2: payment system
11: mobile phone
12: management server device
13: advertising leaflet
14: cash register
15: code sheet
16: terminal device
17: mobile phone
21: terminal device
22: payment server device
23: EC-site server device

DESCRIPTION OF EMBODIMENTS

1. First Example 1.1. Configuration

In the following section, reward program system 1 is explained as the first example of the present invention. In reward program system 1, a service user can obtain reward points to be used instead of money for purchasing goods or services at any affiliate shops by scanning 2-dimensional bar codes printed on publicly distributed advertising leaflets.

FIG. 1 illustrates an overall configuration of reward program system 1. Reward program system 1 comprises mobile phones 11 carried and used by service users, management server device 12 that conducts various managerial tasks of reward program system 1, advertising leaflets 13, which are paper media on which advertisements and 2-dimensional bar codes are printed, cash registers 14 located in shops participating in the reward program, code sheets 15, which are paper media on which 2-dimensional bar codes for allowing service users to use their reward points at the participating shops are printed, terminal devices 16, which are PCs used by staff (service providers) of the participating shops distributing advertising leaflets 13, and mobile phones 17 carried and used by the service providers. In the reward program system 1, a plurality of each of advertising leaflet 13, cash register 14, code sheet 15, terminal device 16 and mobile phone 17 are shown; however, for simplicity of explanation FIG. 1 shows only one of each.

Each of mobile phone 11 and mobile phone 17 has a built-in camera to be used for scanning 2-dimensional bar codes in reward program system 1. Each of mobile phone 11 and mobile phone 17 can conduct data communications with management server device 12 via a mobile telephone network and the Internet. Moreover, various application programs can be installed in each of mobile phone 11 and mobile phone 17.

Each of mobile phone 11 and mobile phone 17 functions as a device having at least the following functional components when it executes processes in accordance with an application program to allow its user to use reward program system 1 (hereinafter referred to as "mobile phone application").
(Storing Unit)

A storing unit stores a terminal identification data set assigned by management server device 12.
(Obtaining Unit)

An obtaining unit scans a 2-dimension bar code and decodes the 2-dimension bar code to obtain an item attribute data set containing an item identification data set.
(Transmitting Unit)

A transmitting unit transmits the terminal identification data set stored by the storing unit and the item attribute data set obtained by the obtaining unit to management server device 12.

Management server device 12 is a server device that can conduct data communications with mobile phones 11, cash registers 14, terminal devices 16, and mobile phones 17 via mobile telephone networks and the Internet. Management server device 12 functions as a device having at least the following functional components when it executes processes in accordance with an application program for managing reward program system 1 (hereinafter referred to as "server application").
(Receiving Unit)

A receiving unit receives a terminal identification data set and an item attribute data set from each of mobile phones 11 and mobile phones 17.

The receiving unit also receives an authentication data set (rescue code) from each of mobile phones 11 and mobile phones 17.

The authentication data set is a data set used for user authentication by a service user or service provider (hereinafter the term "user" is used as a collective term covering both service user and service provider).
(Storing Unit)

A storing unit stores the terminal identification data sets and the item attribute data sets received by the receiving unit in association with each other as log data sets.

The storing unit also stores authentication data sets in association with the terminal identification data sets of mobile phones of users.

The storing unit also stores numbers of reward points that are currently accrued by the users in association with the terminal identification data sets.
(Transmitting Unit)

A transmitting unit transmits to terminal devices 16 log data sets stored in the storing unit that meet an extraction condition indicated by an extraction condition data set transmitted from terminal devices 16.

The transmitting unit also transmits, when a terminal identification data set is changed in response to reception of an authentication data set by the receiving unit, a new terminal identification data set to the mobile phone that transmitted the authentication data set.
(Point Changing Unit)

A point changing unit instructs the storing unit, when the receiving unit receives an item attribute data set indicating an increase or decrease in a number of reward points, to store a new number of reward points increased or decreased in accordance with the item attribute data set in association with the terminal identification data set received with the item attribute data set.
(Code Generating Unit)

A code generating unit generates 2-dimensional bar codes.
(Terminal Identification Changing Unit)

A terminal identification changing unit retrieves, when the receiving unit receives an authentication data set, from among authentication data sets stored in the storing unit, an authentication data set that matches the authentication data set received by the receiving unit, generates a new terminal identification data set, and instructs the storing unit to replace the terminal identification data set stored in the storing unit in association with the retrieved authentication data set with the new terminal identification data set.

Figure 2:
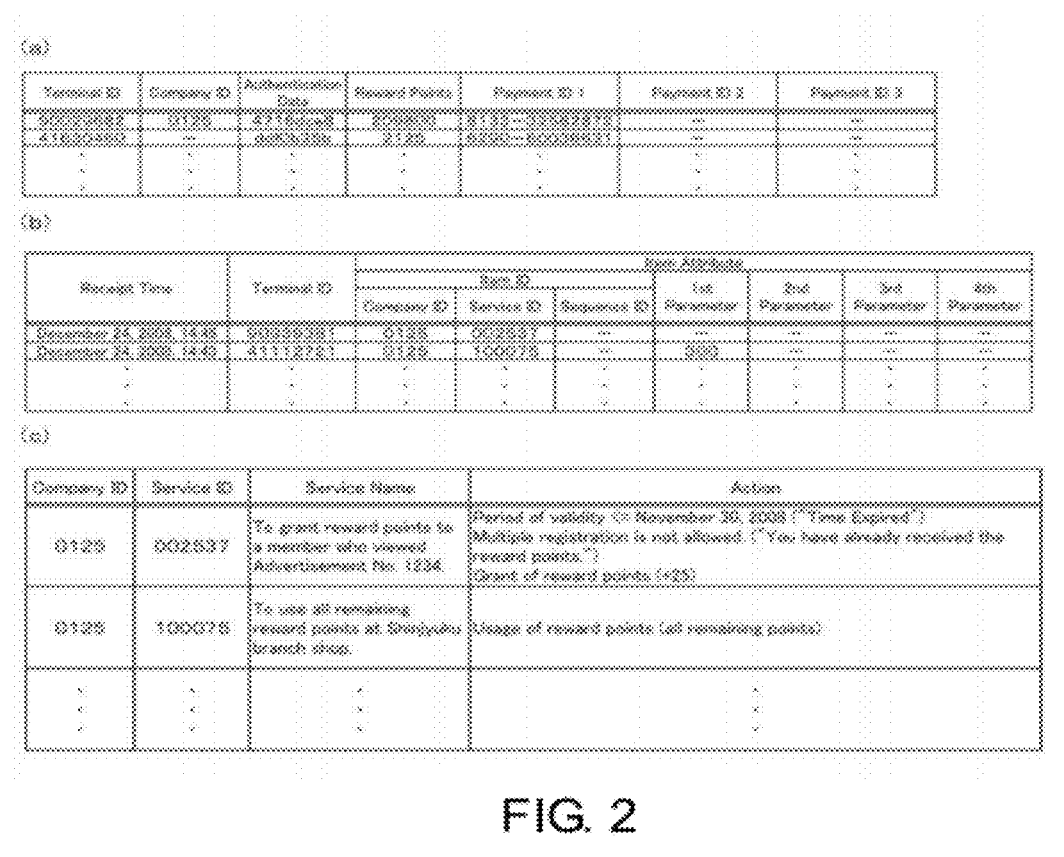

FIG. 2 illustrates an exemplary structure of data stored in the storing unit of management server device 12. FIG. 2(*a*) shows a structure of a user database that contains data sets relating to mobile phones 11 and mobile phones 17 that are carried by users of reward program system 1. In reward program system 1, each user is identified based on a terminal identification data set assigned to a mobile phone carried by the user. Accordingly, there is no difference between a data set specific to a mobile phone and a data set specific to a user of the mobile phone.

The user database contains a plurality of user records, each of which contains a data set specific to a mobile phone. Each of the user records includes the following data fields.
(Terminal Identification Field)

A terminal identification field contains a terminal identification data set assigned to the mobile phone.
(Company Identification Field)

A company identification field contains a company identification data set identifying a company of a service provider when the user is a service provider. When the user is a service user, this field is left empty.
(Authentication Data Field)

An authentication data field contains a password that is used for authenticating the user when the user changes his/her mobile phone and moves his/her reward points from his/her old mobile phone to his/her new mobile phone. This password used for user authentication is referred to as a "rescue code" hereinafter.
(Reward Point Field)

A reward point field contains a number of reward points that is currently accrued by the user.
(Payment Identification Fields 1 to 3)

Each of payment identification fields 1 to 3 contains a combination of a payment company identification data set identifying a payment company (bank, credit company, etc.) that the user uses for payment, and a user identification data set identifying the user at management server device 12 and server devices of payment companies. For example, a payment identification data set "0014-01024510" indicates that the user is identified by the user identification data set of "01024510" at a payment company identified by the payment company identification data set of "0014".

FIG. 2(b) shows a structure of a log database that stores combinations of terminal identification data sets and item attribute data sets transmitted from mobile phone 11 or mobile phone 17 to management server device 12 as log data sets.

The log database contains a plurality of log records, each of which includes the following data fields.
(Receipt Time Field)
A receipt time field contains a receipt time data set indicating a receipt time of data.
(Terminal Identification Field)
A terminal identification field contains a terminal identification data set received from a mobile phone.
(Item Attribute Field)
An item attribute field contains an item attribute data set received from a mobile phone.
The item attribute field contains the following sub-fields.
(Item Identification Sub-Field)
An item identification sub-field contains an item identification data set identifying an item. In this application, the term "item" is used in a broad sense, and it may be, for example, an advertisement, payment for a purchase, etc.
(1st-4th Parameter Sub-Fields)
Each of 1st to 4th parameter sub-fields contains an item attribute data set. For example, when a certain number of reward points are awarded to a user who makes payment for a purchase, the item attribute data set indicates a certain number of reward points based on the payment.

The item attribute field further contains the following sub-fields.
(Company Identification Sub-Field)
A company identification sub-field contains a company identification data set identifying a company providing a service.
(Service Identification Sub-Field)
A service identification sub-field contains a service identification data set identifying a service provided by the service provider.
(Sequence Identification Sub-Field)
A sequence identification sub-field contains a sequence identification data set identifying a specific service among similar services provided by the same company.

FIG. 2(c) shows a structure of an action database that stores action data sets, each of which indicates processes to be executed in accordance with a combination of a terminal identification data set and an item attribute data set that is received by management server device 12 from mobile phone 11 or mobile phone 17.

The action database contains a plurality of action records, each of which has the following data fields.
(Company Identification Field)
A company identification field contains a company identification data set identifying a company that provides services.
(Service Identification Field)
A service identification field contains a service identification data set identifying a service that is provided by the company.
(Service Name Field)
A service name field contains a service name data set indicating a name of the service.
(Action Field)
An action field contains an action data set indicating one or more actions to be executed when an item attribute data set relates to a service identified by the company identification data set and the service identification data set from a mobile phone.

For example, the action data set shown in the first row of the list in FIG. 2(c) indicates that, when an item attribute data set identified by the company identification data set of "0125" and a service identification data set of "002537" is received, 25 points should be awarded to a user identified by a terminal identification data set received together with the item attribute data set under the conditions that the user did not obtain the points previously and a period of eligibility does not expire until Nov. 30, 2008.

Actions indicated by action data sets contained in the action database are registered by, for example, the administrator of management server device 12 in accordance with instructions from service providers.

The overall structure of reward program system 1 will be continued in the following section with reference to FIG. 1. On advertising leaflet 13, in addition to advertisements, two-dimensional bar codes, each of which indicates an item attribute data set in correspondence with one of the advertisements are printed in a form of graphic image. The two-dimensional bar codes printed on advertising leaflet 13 are output from management server device 12 in response to operations performed by an administrator of management server device 12 in accordance with instructions from an advertiser shown on advertising leaflet 13 as a service provider.

In the following explanation, it is supposed that a two-dimensional bar code indicating an attribute data set identified by the following data is printed on advertising leaflet 13. (Any data fields other than the following fields are empty.)
Company identification field: "0125"
Service identification field: "002537"

Cash register 14 is a cash register that can conduct data communication with management server device 12 via the Internet. Cash register 14 has at least the following components in addition to components of a normal cash register.
(Transmitting Unit)
A transmitting unit transmits code requests, each of which contains a company identification data set and a service identification data set to management server device 12.
(Receiving Unit)
A receiving unit receives data of numbers of used reward points and image data sets indicating two-dimensional bar codes.

Code sheet 15 is a sheet on which is displayed a two-dimensional bar code that is used by service users to use their reward points, and it is typically located at a position near cash register 14 so that a service user can scan the two-dimensional bar code using his/her mobile phone easily. In the following explanation, it is assumed that the two-dimensional bar code printed on code sheet 15 indicates an item attribute data set identified by the following data.
Company identification field: "0125"
Service identification field: "100075"

The two-dimensional bar code printed on code sheet 15 is generated and output by management server device 12 in response to operations performed by an administrator of management server device 12 in accordance with an instruction from the service provider. When the administrator receives the instruction, the administrator operates management server device 12 to register, for example, the following action data set in the action database (see FIG. 2(c)).
Company identification field: "0125"
Service identification field: "100075"
Service name field: "Usage of all remaining reward points at Shinjyuku branch shop"
Action field: "Usage of reward points (all remaining reward points)"

The foregoing action data set instructs that a process be executed for using all of the remaining reward points of a user identified by a terminal identification data set when an item attribute data set identified by the company identification data set of "0125" and the service identification data set of "100075" is received together with the terminal identification data set. The process for using reward points contains a sub-process for transmitting a number of used reward points from management server device 12 to a device of a service provider, and a sub-process for updating a number of reward points stored in a reward point field of the user record identified by the terminal identification data set in the user database (see FIG. 2(a)), so that the number of reward points are decreased in accordance with a number of used reward points.

Terminal device 16 is a PC that can conduct data communication with management server device 12 via the Internet. Terminal device 16 functions as a device having at least the following functional components when it executes processes in accordance with an application program for the service user to browse log data sets stored in management server device 12 (hereinafter referred to as "PC application").
(Transmitting Unit)

A transmitting unit transmits requests log data sets from management server device 12.
(Receiving Unit)

A receiving unit receives log data sets from management server device 12. Data communications between management server device 12 and other devices, namely, mobile phones 11, cash registers 14, terminal devices 16, or mobile phones 17 are protected against falsification, tapping and spoofing by cryptographic technologies such as SSL (Secure Socket Layer), etc.

1.2. Operations

Figure 3:
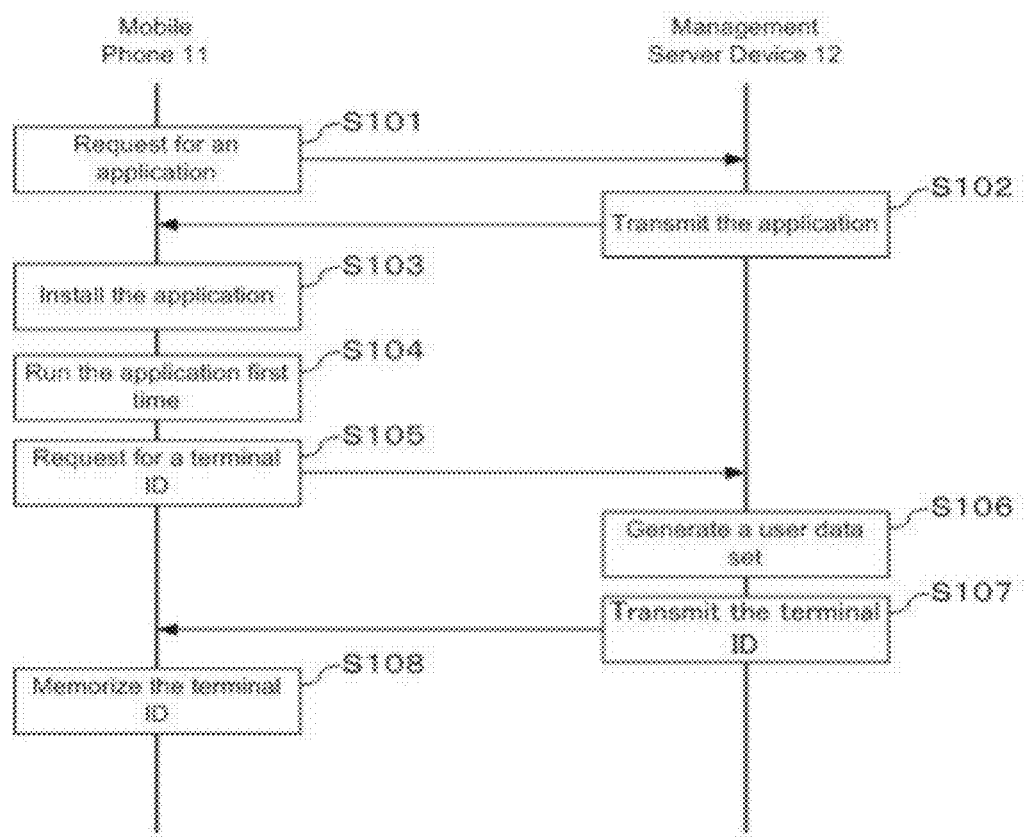
FIG. 3 illustrates a flow of processes executed when a mobile phone is registered to the management server in the reward program system of the first example of the present invention.

Any user who wishes to use reward program system 1 is required to register his/her mobile phone with management server device 12. FIG. 3 illustrates a flow of processes executed when mobile phone 11 is registered with management server device 12 in reward program system 1. Mobile phone 17 of a service provider is registered with management server device 12 by the same processes as when mobile phone 11 is registered, except that a company identification data set of the company is also registered in the company identification field of the user record by the administrator of management server device 12.

The service user inputs a URL (Uniform Resource Locator) of management server device 12 to mobile phone 11, and downloads the mobile phone application from management server device 12 to mobile phone 11 (Steps S101 and S102). Then, the service user operates mobile phone 11 to install the mobile phone application to mobile phone 11 (Step S103), and starts up the installed mobile phone application in mobile phone 11 (Step S104). When the mobile phone application is started up for the first time, mobile phone 11 transmits a request for a terminal identification data set to management server device 12 (Step S105).

In response to the request transmitted in Step S105, management server device 12 adds a new user record to the user database (see FIG. 2(a)), generates a new terminal identification data set that is not assigned to any mobile phone, and stores the newly generated terminal identification data set in the terminal identification field of the user record. Management server device 12 also stores "0" in the reward point field of the user record (Step S106).

Then, management server device 12 transmits the newly generated terminal identification data set to mobile phone 11 (Step S107). Mobile phone 11 stores the terminal identification data set received from management server device 12 in its storing unit (Step S108), and the registration of mobile phone 11 to management server device 12 is completed.

Figure 4:
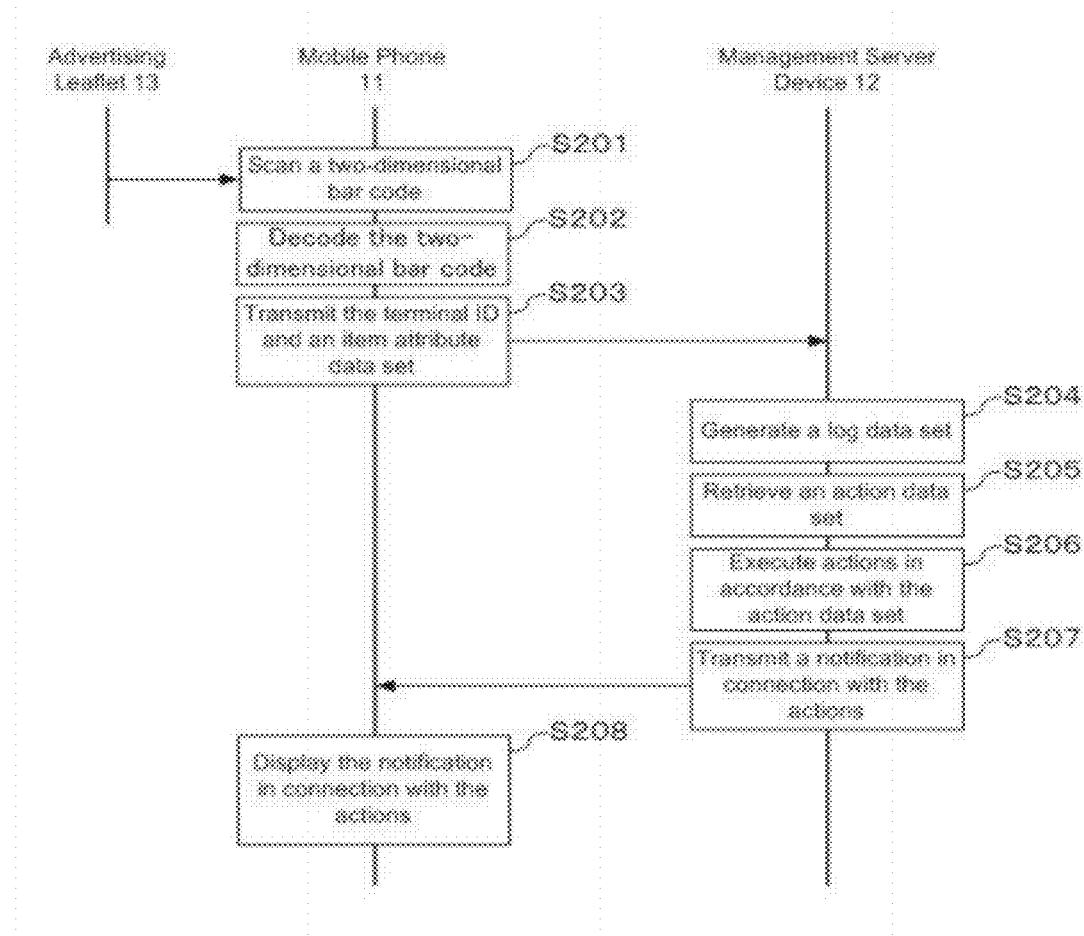
FIG. 4 illustrates a flow of processes executed when reward points are awarded to a service user in the reward program system of the first example of the present invention.

Next, a flow of processes executed in reward program system 1 when the service user obtains reward points from advertising leaflet 13 is explained with reference to FIG. 4. The service user scans the two-dimensional bar code printed close to the advertisement printed on advertising leaflet 13 by using a camera of mobile phone 11 that executes processes in accordance with the mobile phone application (Step S201).

Mobile phone 11 decodes the two-dimensional bar code indicated by an image data set generated by the scanning in Step S201 to generate an item attribute data set without being encoded (Step S202). Then, mobile phone 11 transmits the item attribute data set generated by the decoding processes executed in Step S202 and the terminal identification data set stored in the storing unit of mobile phone 11 to management server device 12 (Step S203).

When management server device 12 receives the terminal identification data set and the item attribute data set from mobile phone 11, management server device 12 adds a new log record to the log database (see FIG. 2(b)) and stores the received data sets to the new log record. Management server device 12 also stores a receipt time data set indicating a time when management server device 12 received the data sets in the receipt time field of the new log record (Step S204).

Then, management server device 12 retrieves from the action database (FIG. 2(c)) an action record that contains each of a company identification data set and a service identification data set contained in the item attribute data set received from mobile phone 11 (Step S205).

Management server device 12 executes a series of processes for giving reward points to the user of mobile phone 11 in accordance with instructions indicated by an action data set stored in the action field of the retrieved action record (Step S206).

More specifically, in Step S206, management server device 12 determines whether the current time is within a term on or before Nov. 30, 2008, and if the determination is affirmative, management server device 12 retrieves a log record from the log database that contains a terminal identification data set, a company identification data set and a service identification data set that are the same as the data sets received from mobile phone 11. When management server device 12 does not retrieve a log data set from the log database meeting the condition, management server device 12 retrieves from the user database (see FIG. 2(a)) a user record containing the terminal identification data set received from mobile phone 11, and updates the data set contained in the reward point field of the retrieved user record so that the number of reward points indicated by the data set is increased by 25 points.

On the other hand, when the current time is later than the given term or a log record with regard to the same user and the same service is retrieved from the log database, the foregoing processes to add reward points are not executed.

Then, management server device 12 transmits to mobile phone 11 a notice of the completion of action indicating a result of addition of reward points (Step S207). When the addition of reward points is executed, mobile phone 11 receives a notice stating, for example, "You got 25 reward points. You have 2,150 reward points now." On the other hand, when there is no addition of reward points, mobile phone 11 receives a notice stating, for example, "Sorry, but no new reward points were given to you, since you have already received the reward points."

Mobile phone 11 displays content of the notice received from management server device 12 on its display unit (Step S208), and the flow of processes executed when the service user obtains reward points from advertising leaflet 13 is completed.

Figure 5:
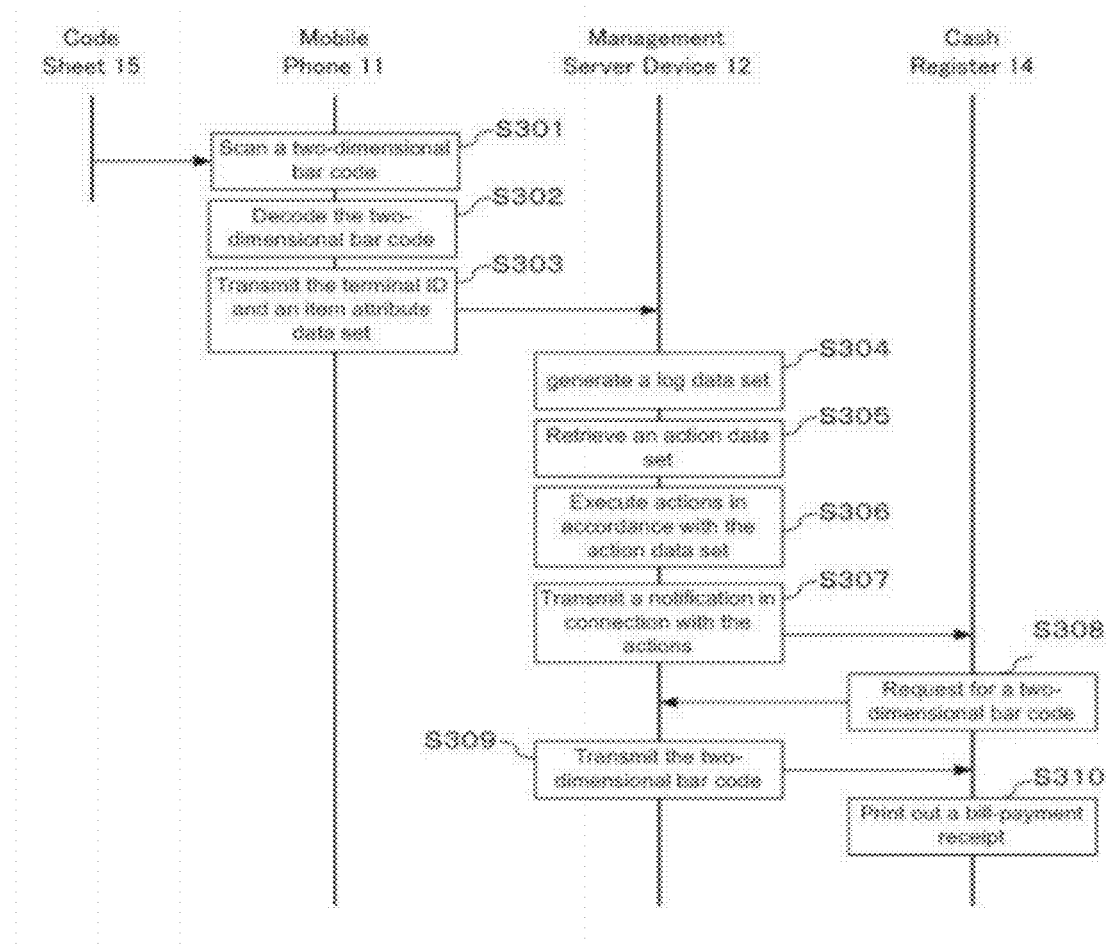
FIG. 5 illustrates a flow of processes executed when reward points are used by the service user in the reward program system of the first example of the present invention.

Next, a flow of processes executed in reward program system 1 when the service user uses his/her reward points at a shop participating in the reward program is explained with reference to FIG. 5.

The service user operates mobile phone 11 to scan a two-dimensional bar code printed on code sheet 15 displayed at a position near cash register 14 in the participating shop (Step S301). Then, a series of processes the same as Steps S202 to S206 shown in FIG. 4 are executed (Steps S302 to S306).

However, in this case, the action in Step S306 is a process for using the service user's reward points (all of the remaining reward points of the service user in this case). More specifically, management server device 12 retrieves from the user database (see FIG. 2(*a*)) a user record containing the terminal identification data set received from mobile phone 11.

Management server device 12 temporarily stores the data set in the reward point field of the retrieved user record in a work area of the storing unit, and updates the data set in the reward point field of the retrieved user record to "0." (In the following explanation, it is assumed that the data set in the reward point field of the retrieved user record before the update is "2150.") Then, management server device 12 generates a new sequence identification data set that is not assigned to any other log record in connection with the company identification data set and the service identification data set, and stores the new sequence identification data set in the sequence identification field of the log record that management server device 12 newly added to the log database in Step S304, in which log record the management server device 12 stored the terminal identification data set and the item attribute data set received from mobile phone 11. Management server device 12 also stores a data set indicating "usage of reward points (−2150)" in the 1st parameter field of the log record to complete a series of processes for using the service user's reward points executed in management server device 12.

Then, management server device 12 transmits a notice of completion of the action to cash register 14, not to mobile phone 11. More specifically, management server device 12 transmits to cash register 14 the reward point data set temporarily stored in the work area, together with the sequence identification data set stored in the log data (Step S307).

When cash register 14 receives the reward point data and the sequence identification data set from management server device 12, cash register 14 calculates an actual billing amount by deducting from the original billing amount a number of reward points indicated by the notified reward point data set, and also calculates 10% of the actual billing amount, rounding down any fractional amount, as a number of reward points newly given to the service user. Then, cash register 14 transmits a request for a two-dimensional bar code containing, for example, the following data sets, to management server device 12 (Step S308).

Company identification field: "0125"
    Service identification field: "000007"
    1st parameter field: "20:35 Dec. 24, 2008"
    2nd parameter field: "+308"

In this case, the data set in the 1st parameter field indicates the current time, and the data set in the 2nd parameter field indicates a number of reward points newly given to the service user.

Management server device 12 generates an image data set of a two-dimension bar-code indicating the above-mentioned data sets in response to the request from cash register 14, and transmits the image data set to cash register 14 (Step S309).

When cash register 14 executes the processes of Steps S308 and S309, cash register 14 also displays the actual billing amount after deduction of the reward points, on its display unit. When the service user pays cash covering the displayed amount to the cashier of the shop and the cashier inputs the amount of received cash to cash register 14, cash register 14 prints out the two-dimensional bar code indicated by the image data set received from management server device 12 in Step S309 on a receipt, together with information normally printed on a receipt such as the original billing amount, a breakdown of the original billing amount, the number of used reward points, the actual billing amount, an amount of cash received and an amount of change given (Step S310).

It should be noted that the sequence identification data set that cash register 14 receives from management server device 12 in Step S307 is stored in the storing unit of cash register 14, and is used by the cashier when, for example, s/he verifies the number of used reward points indicated by the log record received from management server device 12 against the number of used reward points recorded in cash register 14. This is the flow of processes executed in reward program system 1 when the service user uses his/her reward points.

The two-dimensional bar code printed on the bill-payment receipt can be used by a service user to obtain reward points. To enable the two-dimensional bar code to be used for the purpose, an action record containing the following data sets is registered in advance in the action database stored in management server device 12.

Company identification field: "0125"
    Service identification field: "000007"
    Service name field: "Grant of reward points at Shinjyuku branch shop (10% of billing amount)"
    Action field: "For one-time use (Error message "This bar-code has already been used."); Valid period<=(1st parameter+ 30 days); Number of reward points to be granted=(2nd parameter)"

The above-described action data set instructs that, when an item attribute data set containing a company identification data set of "0125" and a service identification data set of "000007" is received, a number of reward points indicated by the 2nd parameter data set contained in the item attribute data set should be granted to the service user under the conditions that this bar-code has not been used yet and that the current time is within a 30-day period starting from the time indicated by the 1st parameter data set contained in the item attribute data set.

When the service user scans the two-dimensional bar code printed on the billing receipt in Step S310 using mobile phone 11, the item attribute data set indicated by the two-dimensional bar code is transmitted to management server device 12 together with the terminal identification data set of mobile phone 11, and management server device 12 executes a series of processes for granting reward points to the service user in accordance with contents of the above-mentioned action data set.

It should be noted that the two-dimensional bar code on the billing receipt can be used by any service user. Namely, if the service user who paid the billing amount is not interested in obtaining the reward points, s/he can give it to someone else without scanning the two-dimension bar-code using his/her mobile phone 11, and the person who receives the billing receipt can scan the two-dimensional bar code using his/her mobile phone 11 to obtain the reward points.

Figure 6:
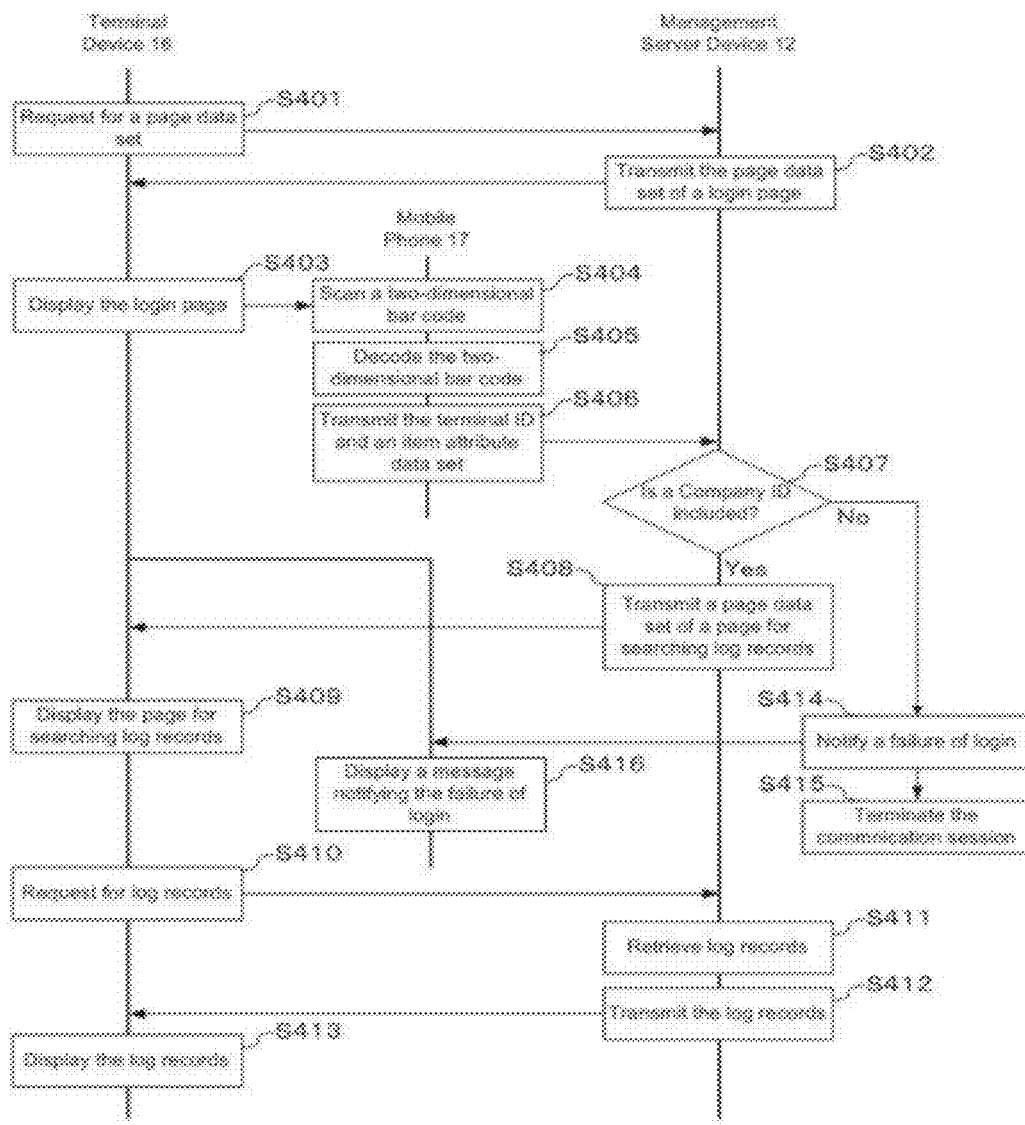
FIG. 6 illustrates a flow of processes executed when log data is browsed by a service provider in the reward program system of the first example of the present invention.

Next, a flow of processes executed in reward program system 1 when the service provider browses log records in connection with his/her company's services using terminal device 16 is explained with reference to FIG. 6.

The service provider operates terminal device 16 to start a browser application, and inputs a URL of a site for searching log records provided by management server device 12 in the browser's screen. The URL input to terminal device 16 is transmitted to management server device 12 as a request for a page data set instructing display of a web page of the site (Step S401).

In response to the request, management server device 12 generates a page data set of a login page, and transmits it to terminal device 16 (Step S402). The login page displayed on the display unit of terminal device 16 contains a two-dimensional bar code indicating an item attribute data set containing, for example, the following data sets.

Company identification field: "0000"
Service identification field: "00000005"
Sequence identification field: "04120315"

The company identification data set of "0000" is a special identification data set indicating the administrator of management server device 12. The service identification data set of "00000005" indicates a service of "Logging into the site to search log records." The sequence identification data set of "04120315" identifies a communication session established between terminal device 16 and management server device 12 in Step S401.

Terminal device 16 displays the login page containing the two-dimensional bar code on its display unit in accordance with the page data set received from management server device 12 (Step S403). The service provider scans the two-dimensional bar code displayed on the display unit of terminal device 16 by a camera of mobile phone 17 (Step S404). Mobile phone 17 decodes the two-dimensional bar code to obtain the item attribute data set (Step S405).

Mobile phone 17 transmits the item attribute data set obtained in Step S405 to management server device 12 together with its terminal identification data set stored in its storing unit (Step S406). Management server device 12 retrieves a user data record containing the received terminal identifying data set from the user database (see FIG. 2(a)), and determines whether the retrieved user record contains a company identification data set in its company identification field (Step S407).

When a company identification data set is contained in the company identification field of the retrieved user record as a result of the determination made in Step S407 (Step S407; Yes), management server device 12 transmits a page data set instructing that a page for searching log records be displayed, to terminal device 16 (Step S408). Terminal device 16 displays the page for searching log records on its display unit in accordance with the received page data set (Step S409).

When the service provider inputs conditions for searching log records in the page for searching log records, terminal device 16 transmits a request for log records containing a search condition data set indicating the search conditions input by the service provider to management server device 12 (Step S410).

Management server device 12 retrieves log records meeting the search conditions indicated by the search condition data set contained in the request from among log records in the log database (see FIG. 2(b)) that contains the company identification data set contained in the user record retrieved in Step S407 (Step S411).

Management server device 12 generates a page data set instructing that a page showing the search result be displayed, and transmits the page data set to terminal device 16 (Step S412). Terminal device 16 displays a page showing the search result in accordance with the received page data set (Step S413). As a result, the service provider is able to analyze, for example, any effect of advertising leaflet 13, etc.

When the determination in Step S407 is made, if the company identification field is empty, it means that the user of the mobile phone is not the service provider. In this case (Step S407; No), management server device 12 generates a page data set instructing that a page notifying a failure of login be displayed, and transmits the page data set to terminal device 16 (Step S414). Then, management server device 12 terminates the communication session established in Step S401, namely, the communication session identified by the sequence identification data set contained in the item attribute data set received from mobile phone 17 (Step S415).

When terminal device 16 receives the page data set from management server device 12 in Step S414, terminal device 16 displays the page notifying a failure of login in accordance with the page data set (Step S416). This is the flow of processes executed in reward program system 1 when the service provider browses log records.

Figure 7:
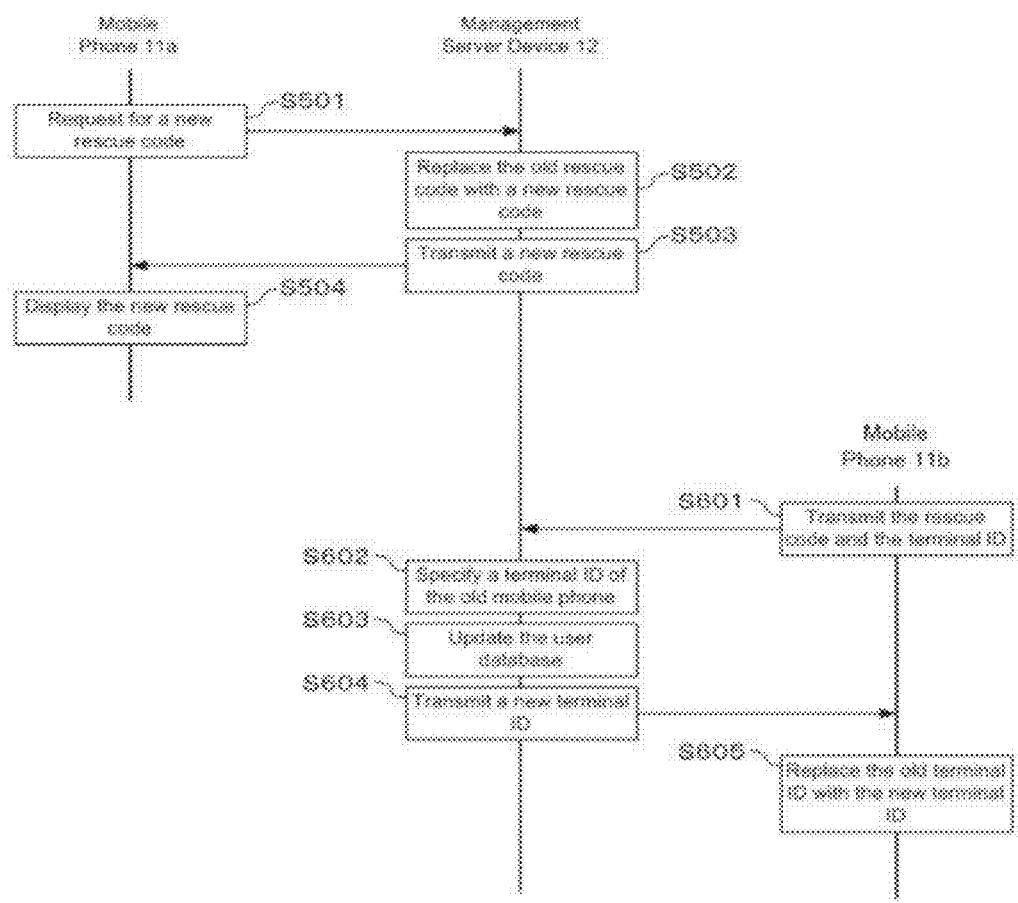
FIG. 7 illustrates a flow of processes executed when a registered mobile phone of the service user is changed in the reward program system of the first example of the present invention.

Next, a flow of processes executed in reward program system 1 when a user gets a new mobile phone, and transfers his/her data sets stored in the user database (see FIG. 2(a)) of management server device 12 such as a reward point data set from the old mobile phone to the new mobile phone, is explained with reference to FIG. 7. In FIG. 7, the old mobile phone is shown as mobile phone 11a and the new mobile phone is shown as mobile phone 11b. The processes explained below are executed when a service provider changes his/her mobile phone 17 and transfers his/her data sets from his/her old mobile phone 17 to his/her new mobile phone 17.

A service user operates mobile phone 11a to start the mobile phone application, and selects an item of "Display of rescue code" from a menu shown in the display unit of mobile phone 11a. In response to the selection made by the service user, mobile phone 11a transmits a request for a rescue code to management server device 12 (Step S501). The request contains a terminal identification data set of mobile phone 11a.

In response to the request, management server device 12 retrieves a user record from the user database (see FIG. 2(a)) that contains the identification data set contained in the request. Next, management server device 12 generates a new rescue code that has not been assigned to any user record in the user database, and stores the new rescue code in the authentication data field of the retrieved user record (Step S502). In a case where a rescue code has been stored in the authentication data field already, the stored rescue code is overwritten with the new rescue code.

Management server device 12 transmits the new rescue code to mobile phone 11a (Step S503). Mobile phone 11a displays the received rescue code on its display unit (Step S504). The service user makes a note of the displayed rescue code. Then, mobile phone 11a can be discarded.

On the other hand, the service user completes the registration of mobile phone 11b to management server device 12. The service user selects an item, "Transition of data" from a menu shown in the display unit of mobile phone 11b. In response to the selection made by the service user, mobile phone 11b displays a page for inputting a rescue code. The service user inputs the rescue code that was displayed in mobile phone 11a in Step S504, and performs an operation to transmit the rescue code. In response to the operation, mobile phone 11b transmits the rescue code input by the service user to management server device 12 together with the terminal identification data set stored in the storing unit of mobile phone 11b (Step S601).

When management server device 12 receives the rescue code and the terminal identification data set from mobile phone 11b, management server device 12 retrieves a user record containing the received rescue code from the user database (see FIG. 2(a)), and specifies a terminal identification data set in the retrieved user record as the terminal identification data set of the old mobile phone 11 (Step S602).

Then, management server device 12 generates a new terminal identification data set that has not been assigned to any user record, and overwrites the terminal identification data set in the user record retrieved in Step S602 with the new terminal identification data set. Management server device 12 retrieves from the user database (see FIG. 2(a)) a user record containing the user identification data set received from mobile phone 11b, and deletes the retrieved user record (Step S603).

When management server device 12 completes the process for updating the user database in Step S603, management server device 12 transmits the terminal identification data set newly generated in Step 603 to mobile phone 11b (Step S604). In mobile phone 11 the terminal identification data set stored in its storing unit is overwritten with the new terminal identification data set received from management server device 12 (Step S605). As a result of the foregoing processes, the user record that was stored in association with mobile phone 11a is now stored in association with mobile phone 11b.

The above-described transition of user record by use of a rescue code can be performed even when a mobile phone is broken or lost. Namely, if the user is informed of the rescue code in accordance with the processes of Steps S501 to 504 and makes a note of the rescue code, the user can use his/her reward points etc., even after losing his/her mobile phone simply by inputting the rescue code to his/her new mobile phone.

This is the flow of processes executed in reward program system 1 when a user transfers his/her user record from his/her old mobile phone to his/her new mobile phone.

1.3. Modifications of First Example

1.3.1. First Modification

It is possible to modify the above-explained reward program system 1 to a discount ticket distribution system where a discount ticket for obtaining a discount of a billing amount when a service user purchases goods at a shop participating in the system is distributed to mobile phone 11 of the service user.

In the coupon distribution system, when the service user scans a two-dimensional bar code on advertising leaflet 13, after receiving the terminal identification data set of mobile phone 11 and the item attribute data set indicated by the two-dimensional bar code from mobile phone 11, management server device 12 transmits to mobile phone 11 an image data set indicating a discount ticket, instead of increasing the reward points recorded in the service user's record, in accordance with the action data set.

In the foregoing case, the service user can obtain a discount from a billing amount when purchasing any goods at a participating shop by showing the discount ticket displayed on the display unit of mobile phone 11 to a cashier of the shop.

When the service provider (a staff member of a participating shop) wishes to know the current status of usage of discount tickets, the service provider obtains a two-dimensional bar code for recording usage of discount tickets from management server device 12 by use of terminal device 16, prints out the two-dimensional bar code on a sheet, and places the sheet around cash register 14. Since the two-dimensional bar code is used only for recording usage of discount tickets, no action data set for the two-dimensional bar code is registered in the action database When the staff member of the participating shop discounts an amount charged for a purchase in accordance with the discount ticket, s/he requests the service user to scan the two-dimensional bar code printed on the sheet by use of mobile phone 11. Then, a service ID and parameters that indicate the time when a discount ticket was issued and the place where the discount ticket was used are recorded as log data sets in the log database. Accordingly, the service provider can browse the log data sets to know the current status of usage of discount tickets.

1.3.2. Second Modification

In the above-explained reward program system 1, it is possible, for example, for the service provider to grant reward points to a service user who purchases both a 1st and a 2nd volume of a series of books, by registering in the action database an action data set that instructs that reward points be granted to a service user who shot certain plural two-dimensional bar codes in the past.

In this case, the service provider should register in the action database an action data set for a two-dimensional bar code printed on the outside cover of 1st volume, such as "When there is a log data set indicating service ID=001002, grant 50 reward points," and register in the action database an action data set for a two-dimensional bar code printed on the outside cover of the 2nd volume, such as "When there is a log data set indicating service ID=001001, grant 50 reward points." Service ID "001001" is an ID identifying the 1st volume, and service ID "001002" is an ID identifying the 2nd volume.

The above-described modification may be also applied, for example, to issuance of discount tickets as explained in the first modification, distribution of content data sets, etc. as well as to granting reward points. Namely, it is also possible, for example, for a service provider of a site for distributing movie data sets by means of video streaming to distribute a bonus movie data set by video streaming only to any service user who shot the two-dimensional bar code printed on the outside cover of DVD package of the movie. In this case, the service provider should register in the action database an action data set for a two-dimensional bar code shown on a Web page of the content data distribution site, such as "When there is a log data set indicating service ID=000030, distribute the bonus movie data set." Service ID "000030" is an ID identifying the movie DVD.

1.3.3. Third Modification

It is also possible to realize an access management system in which a Web page owner permits only persons that the Web page owner has met to access his/her Web page or enter his/her personal virtual space in a network.

In the access management system, for example, when person A wishes to access a Web site of person B, person A is required to scan a two-dimensional bar code shown in a display of a mobile phone of person B by a camera of a mobile phone of person A.

When person B wishes to permit person A to access the Web site of person B, person B operates his/her mobile phone and requests management server device 12 to transmit a two-dimensional bar code indicating an item attribute data set containing service ID "00002000", service ID "00002000" being an ID for permitting a person to access the Web site of person B.

The mobile phone of person B displays the two-dimensional bar code that is transmitted from management service device 12 in response to the request. Person A scans the two-dimensional bar code displayed on the mobile phone of person B, using his/her mobile phone. As a result, a log data set containing service ID "00002000" is registered to the log database as a log data set of person A.

On the other hand, person B requests the administrator of management server device 12 to register an action data set for a two-dimensional bar code displayed in a login page of his/her Web site that indicates, for example, "When there is a log data set indicating service ID=00002000, permit login". Then, when person A scans the two-dimensional bar code shown in the login page of the Web site of person B by use of his/her mobile phone, person A can login the Web site. With regard to any person who did not meet person B, the log data set indicating service ID="00002000" cannot be registered in the log database. Accordingly, any such person cannot log in to the login page of the Web site of person B.

1.3.4. Fourth Modification

It is also possible to realize an attendance management system that checks, for example, attendance at classes by browsing log data sets recorded in the system according to this invention. A teacher who uses the attendance management system operates his/her terminal device and requests management server device 12 to transmit a two-dimensional bar code at the beginning of the class, in the middle of the class, and at the end of the class. In response to the requests, management server device 12 transmits to the terminal device a two-dimensional bar code indicating a unique service ID three times, and the terminal device displays the two-dimensional bar codes displays on a screen in the classroom via a beamer. Each student who attends the class scans the two-dimensional bar codes displayed on the screen using his/her mobile phone 11.

According to the attendance management system, the user database (see FIG. 2(a)) has a data field that stores names of users, and names of users (students) are registered to the field in advance. Then, when management server device 12 receives a request for log data sets from the terminal device of the teacher, management server device 12 extracts the log data sets including the unique service IDs for the beginning of class, the middle of class, or the end of class, and specifies the names of students who attended the class based on a terminal identification data set contained in the log data sets and the user data sets in the user database. Management server device 12 transmits the names of students who attended the class to the terminal device of the teacher.

In the above-described system, when the teacher wants to know the names of students who attended the class, s/he simply displays two-dimensional bar codes on the screen at the beginning of the class, in the middle of the class, and at the end of the class, and inputs an extraction condition for extracting all log data sets indicating service IDs of the two-dimensional bar codes in the log extraction page after the class, to obtain a list of names of students who attended the class.

2. Second Example

In the following section, payment system 2 is explained as the second example of the present invention. In payment system 2, a service user who purchases commodities or services can easily authenticate himself/herself by a simple action when s/he settles the payment of purchase by deducting an amount payable from his/her deposit in his/her bank account or by use of his/her credit card.

Payment system 2 has many similarities to reward program system 1. Accordingly, in the following explanation, characters of payment system 2 that are different from those of reward program system 1 will be mainly explained. In the following explanation, with regard to devices and elements that payment system 2 has in common with reward program system 1, the same reference signs as used for reward program system 1 will be used.

Figure 8:
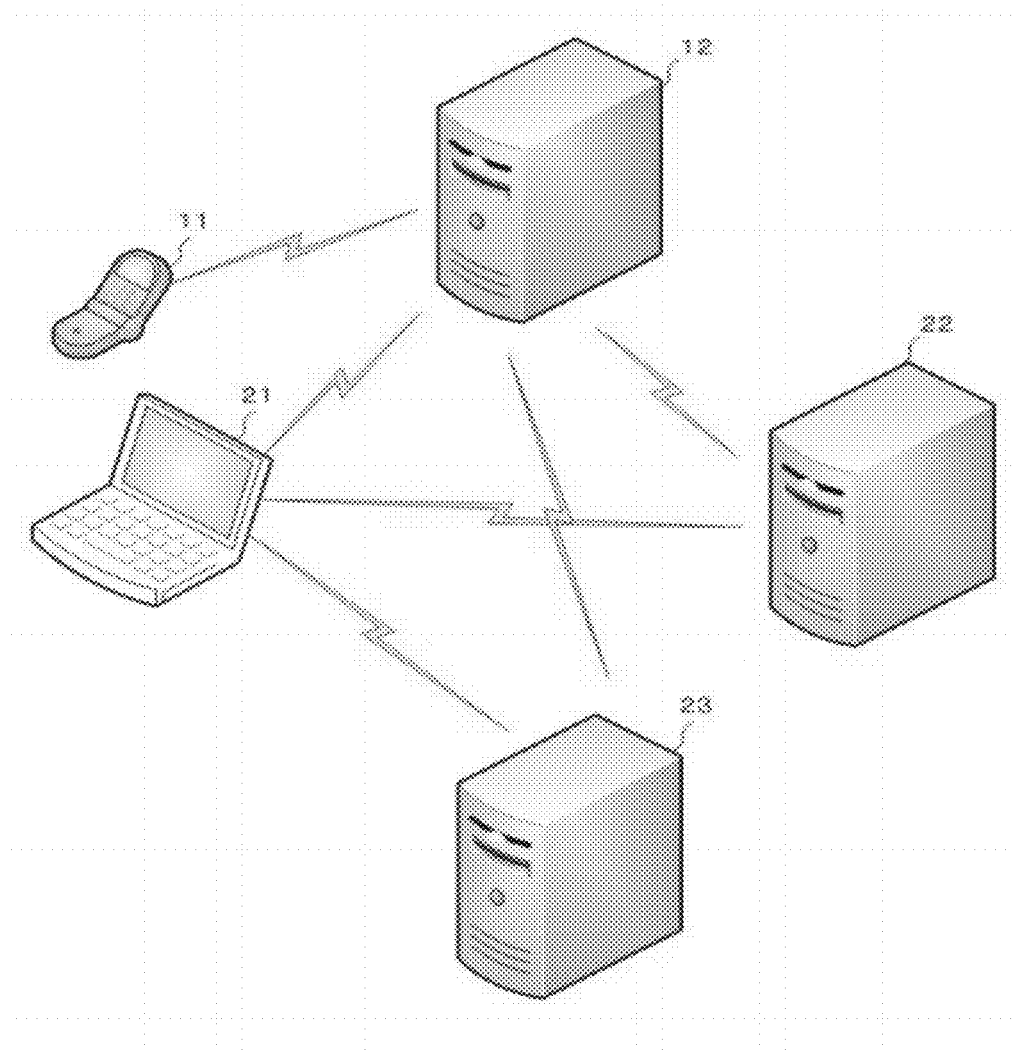
FIG. 8 illustrates an overall configuration of a payment system of the second example of the present invention.

FIG. 8 illustrates an overall configuration of payment system 2. Payment system 2 employs terminal device 21 that is a PC used by a service user, payment server device 22 that is a PC used by a service provider, i.e. an operator of payment system, and EC-site server device 23 that provides a virtual shop selling commodities or services via the Internet, as well as mobile phone 11 that is used by a service user and management server device 12 that manages payment system 2. Management server device 12, terminal device 21, payment server device 22 and EC-site server device 23 can communicate with one another via the Internet.

When management server device 12 of payment system 2 executes processes in accordance with instructions of an application program for the server, management server device 12 works as a device having at least the following functional elements in addition to the functional elements of management server device 12 of reward program system 1:
(Receiving unit) This unit receives a notice of payment completion that is transmitted from payment server device 22 in response to a payment request transmitted from the transmitting unit of management server device 12. This unit also receives a request for a two-dimensional bar code from EC-site server device 23.
(Transmitting unit) This unit transmits a notice of payment completion to EC-site server device 23 in response to the notice of payment completion received by the receiving unit of management server device 12. This unit also transmits a two-dimensional bar code to EC-site server device 23.
(Storing unit) This unit stores action data sets including condition data sets indicating conditions on item attribute data sets.
(Determining unit) This unit determines whether an item attribute data set received by the receiving unit meets the conditions indicated by condition data sets included in the action data sets stored in the storing unit.

When terminal device 21, which displays a two-dimensional bar code indicating an item attribute data set to the service provider in payment system 2, executes processes in accordance with instructions from an application program for the service provider's terminal device, terminal device 21 works as a device having at least the following functional elements:
(Code receiving unit) This unit receives two-dimensional bar codes from EC-site server device 23 or management server device 12.

Figure 9:
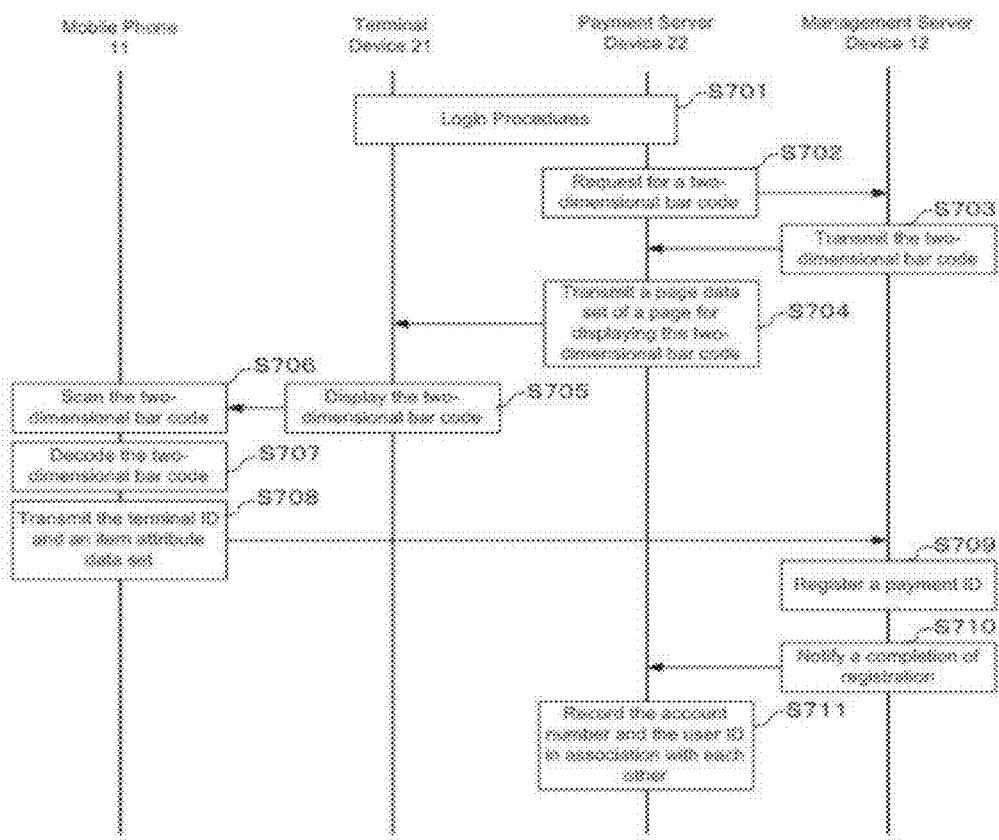
FIG. 9 illustrates a flow of processes executed when a payment method and a mobile phone of a service user are registered in the payment system of the second example of the present invention.

Operations of payment system 2 will be explained in the following section. First, procedures needed to complete registration of mobile phone 11 are explained with reference to FIG. 3. In addition to the registration procedures, a service user who wishes to use payment services in payment system 2 is required to register mobile phone 11 with each company for which settlement services are to be used. FIG. 9 illustrates a flow of processes executed by payment system 2 when the service user selects ABC Bank that operates a Web site of net-banking services by payment server device 22 as a company that the service user uses for settling payments in payment system 2, and registers mobile phone 11 to use payment system 2.

The service user operates terminal device 21 to access the net-banking Web site of ABC Bank. When the service user accesses the Web site, s/he inputs his/her user ID and password and is authenticated for log-in (Step S701).

The service user operates terminal device 21 to select an item titled "Registration of mobile phone" from a menu shown on a menu page of the net-banking Web site. In response to the selection, terminal device 21 transmits a request for two-dimensional bar code. The request contains the following data (Step S702).

Company ID: "0103"
    Service ID: "00000001"
    1st Parameter: "78237698"
    2nd Parameter: "43526587"

The company ID is an ID identifying ABC Bank. The service ID is an ID identifying a service of registering a mobile phone to use payment system 2. The 1st parameter indicates an ID identifying a communication session established between terminal device 21 and payment server device 22. The 2nd parameter indicates a user ID used by ABC for identifying the service user. The user ID is generated by payment server device 22. A combination of the company ID and the user ID functions as a payment ID.

In response to the request from payment server device 22, management server device 12 generates a two-dimensional bar code indicating an item attribute data set that contains the above-described data and a sequence ID generated by management server device 12. Then, management server device 12 transmits the two-dimensional bar code to payment server device 22 (Step S703). The sequence ID is an ID identifying a communication session established between payment server device 22 and management server device 12.

Payment server device 22 generates a page data set for displaying the two-dimensional bar code received from management server device 12, and sends the page data to terminal device 21 (Step S704). Terminal device 21 displays the two-dimensional bar code in accordance with the page data set received from payment server device 22 (Step S705).

The service user scans the two-dimensional bar code displayed in terminal device 21 by use of mobile phone 11 (Step S706). Mobile phone 11 decodes the two-dimensional bar code, and obtains the item attribute data set (Step S707). Terminal device 21 transmits its terminal ID and the item attribute data set obtained in Step S707 to management server device 12 (Step S708).

When management server device 12 receives the terminal ID and the item attribute data set, management server device 12 executes a series of processes for registering mobile phone 11 with a company in accordance with the service ID contained in the item attribute data set. Namely, management server device 12 extracts a user data record from the user database (see FIG. 2(a)) containing the user ID contained in the item attribute data set, and stores the payment ID of "0103-43526587," which is a combination of the company ID and the 2nd parameter (the user ID) contained in the item attribute data set, in one of the empty data fields "payment ID 1" to "payment ID 3" of the extracted user data record (Step S709).

After management server device 12 completes the registration of payment ID in Step S709, management server device 12 transmits a notice of completion of registration to payment server device 22 that is identified by the sequence ID contained in the item attribute data set received from mobile phone 11 (Step S710). The notice contains the 1st parameter contained in the item attribute data set that management server device 12 received from mobile phone 11, i.e. the ID identifying a communication session established between terminal device 21 and payment server device 22.

Payment server device 22 recognizes that a registration of the payment ID in connection with terminal device 21, that payment server device 22 communicates with, is completed at management server device 12 based on the ID identifying the communication session contained in the notice received from management server device 12. Then, payment server device 22 stores the 2nd parameter, i.e. the user ID, that payment server device 22 transmitted to management server device 12 in Step S702, in association with an account number that is registered in connection with the service user at payment server device 22 (Step S711).

The foregoing is an explanation of processes executed by payment system 2 when mobile phone 11 is registered to payment system 2 to allow a service user to the payment services provided by payment system 2.

Next, processes executed by payment system 2 when the service user purchases a commodity using the EC site named EC-BEST and makes a payment in payment system 2 will be explained in the following section with reference to FIG. 10. The service user operates terminal device 21 and accesses the Web site of EC-BEST provided by EC-site server device 23. Then, the service user selects a commodity to be purchased and selects "To settle payment at ABC Bank by use of mobile phone" as a payment method to be used for settling the payment of the purchase in the Web site (Step S801).

In response to the selections of the commodity and the payment method made by the service user, EC-site server device 23 transmits a request for a two-dimensional bar code indicating the following data to management server device 12 (Step S802).

Company ID: "0083"
    Service ID: "00000500"
    1st Parameter: "36479827"
    2nd Parameter: "0103"
    3rd Parameter: "25000 Yen"
    4th Parameter: "001 372698 EC-BEST"

The company ID is an ID identifying EC-BEST. The service ID is an ID indicating a request for settlement of payment. The 1st parameter is an ID identifying a communication session established between terminal device 21 and EC-site server device 23. The 2nd parameter is an ID identifying the company providing payment services, i.e., ABC Bank. The 3rd parameter indicates an amount to be charged of the commodity. The 4th parameter indicates information of a bank account to which payment should be remitted.

Then, processes identical to the processes executed in Step S703 to Step S708 shown in FIG. 9 are executed by mobile phone 11, terminal device 21, EC-site server device 23 and management server device 12 (Step S803 to Step S808). In Step S803 to Step S808, EC-site server device 23 takes the role of payment server device 22 in Step S703 to Step S708.

When management server device 12 receives the terminal ID and the item attribute data set from mobile phone 11 (Step S808), management server device 12 retrieves a user data record containing the received user ID from the user database (see FIG. 2(a)). Then, management server device 12 searches for a payment ID that contains an ID of a payment company indicated by the 2nd parameter of the item attribute data set received from mobile phone 11 from among the data fields payment ID 1 to payment ID 3 of the retrieved user data record. In this case, "0103-43526587" is searched as the payment ID.

Management server device 12 transmits a request for settlement of payment to payment server device 22 of ABC Bank that is identified by the ID "0103" (Step S809). The request contains the user ID "43526587" that is contained in the searched payment ID, and the 3rd parameter "25000 Yen" and the 4th parameter "001 372698 EC-BEST" that are contained in the item attribute data set received from mobile phone 11.

When management server device 12 receives the request for settlement of payment, management server device 12 executes a series of processes for remitting the amount "25000 Yen" indicated by the 3rd parameter from the bank account of the service user identified by the user ID to the bank account identified by the 4th parameter "001 372698 EC-BEST" in accordance with the user ID and the parameters contained in the request (Step S811).

When management server device 12 receives a notice of completion of payment, management server device 12 forwards the notice of completion of payment to EC-site server device 23 (Step S812). The notice of completion of payment contains the 1st parameter contained in the item attribute data set received by management server device 12 from mobile phone 11, i.e. the ID identifying the communication session established between terminal device 21 and EC-site server device 23.

EC-site server device 23 can recognize that the settlement of payment in connection with terminal device 21, which EC-site server device 23 communicates with, has been completed based on the ID indicating the communication session contained in the notice received from management server device 12. Then, EC-site server device 23 transmits a notice of completion of payment to terminal device 21 (Step S813). Terminal device 21 displays the notice of completion of payment received from EC-site server device 23 to the service user (Step S814).

In the case where EC-site server device 23 fails to receive a notice of completion of payment from management server device 12 in Step 812 for a predetermined period of time after management server device 12 transmitted the page data for displaying the two-dimensional bar code to terminal device 21 in Step S804, EC-site server device 23 determines that the payment process failed, and transmits a notice of failure of payment to terminal device 21 and terminates the communication session with terminal device 21. The foregoing is an explanation of the series of processes executed by payment system 2 when a payment for a commodity or service is settled using payment system 2.

2.1. Modifications of Second Example

2.1.1. First Modification

Payment system 2 described above is a system for facilitating purchases of commodities or services. Payment system 2 may be modified into a system for distributing content data sets with simple procedures for authenticating the service user and for settling a payment for purchase of a content data set. According to the system, a content distribution server device takes the role of EC-site server device 23 in payment system 2. According to the content distribution system, the service user purchases a content data set such as a movie data set or a music data set using the content distribution site, instead of commodities using the EC-site.

Figure 10:
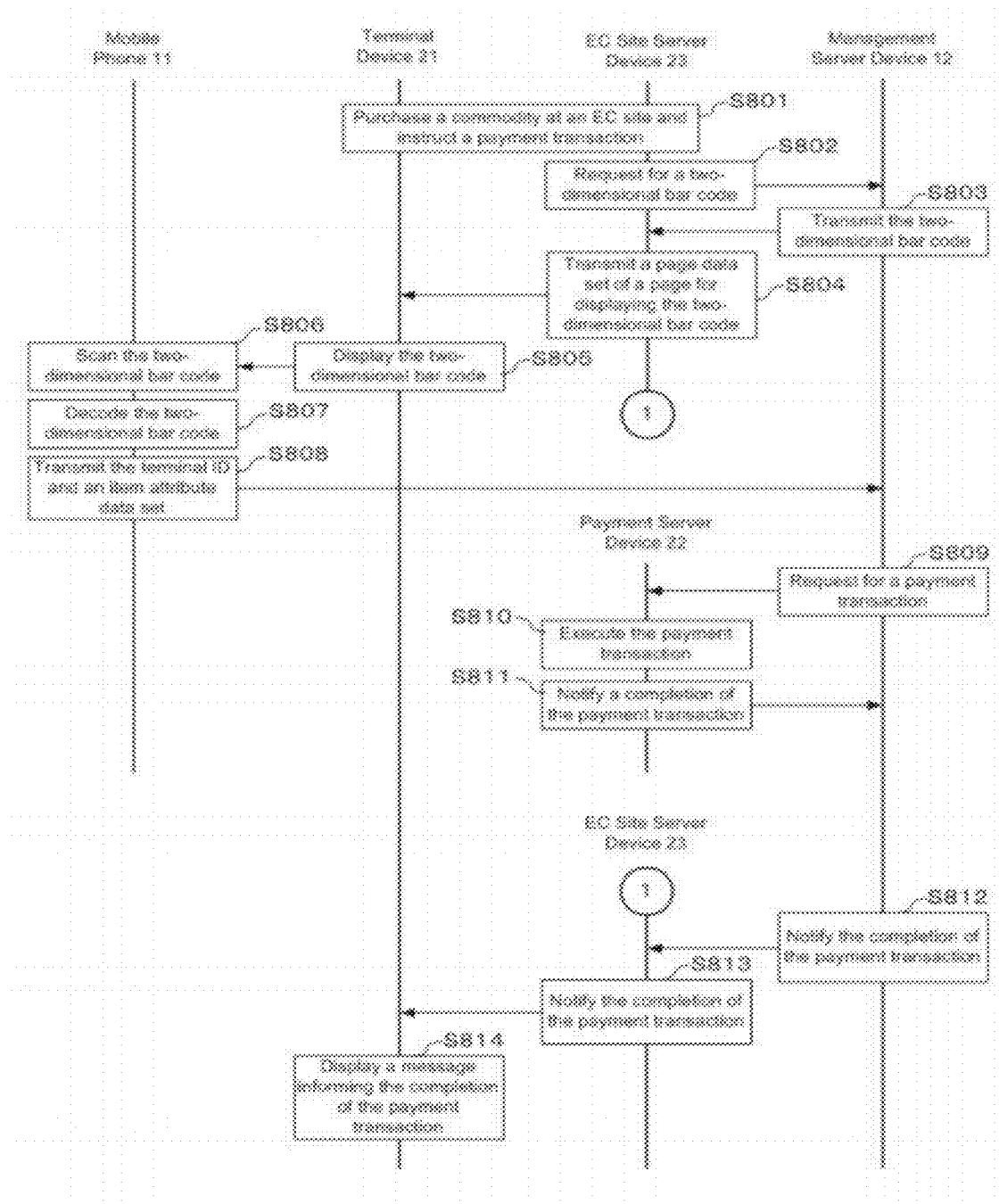
FIG. 10 illustrates a flow of processes executed when a payment is made in the payment system of the second example of the present invention.

After a content data set is purchased and an instruction for payment of the amount to be charged is made, processes identical to the processes executed in Step S802 to Step S812 shown in FIG. 10 are executed by mobile phone 11, terminal device 21, the content distribution server device and management server device 12. While these processes are being executed, the content distribution server device suspends streaming of a content data set such as a movie data set or a music data set selected by the service user, and awaits a notice of completion of payment from management server device 12. When the content distribution server device receives a notice of completion of payment from management server device 12 within a predetermined period of time, the content distribution server device starts to distribute the content data set to terminal device 21. On the other hand, when the content distribution server device fails to receive a notice of completion of payment within the predetermined period of time, the content distribution server device notifies the failure to terminal device 21, and terminates the communication session with terminal device 21 without distributing the content data set to terminal device 21.

2.1.2. Second Modification

According to payment system 2 described above, commodities or services are delivered after the payment is made. Namely, according to payment system 2, when a commodity is purchased by the service user, an arrangement for delivery of the commodity is made after the payment is made, and when a content data set is purchased by the service user, the content data set is distributed to the service user's mobile phone after the payment is made. It is possible to modify payment system 2 into an advance ticket selling system by which the service user can purchase an electronic ticket in advance; in other words, a right to receive a content data set in the future, or a right to watch a movie, a play, a sporting event a music concert, etc. at a later time.

According to the advance ticket selling system, the storing unit of management server device 12 stores a rights database so that management server device 12 can check easily whether a certain service user has a certain advance ticket for receiving content data set or watching a movie, etc. FIG. 11 illustrates an exemplary structure of data stored in the rights database. The rights database contains plural rights data records, each of which indicates which service user has a right to receive which content, etc. Each of the rights data records has data fields named "Terminal ID," "Company ID," "Service ID," "Name of Contents," and "Period of Validity." The data field "Terminal ID" stores a terminal ID identifying a service user who has a right to receive contents, etc. A combination of a company ID stored in the data field "Company ID" and a service ID stored in the data field "Service ID" identifies a content, such as content data set to be distributed, movies to be watched, etc. The data field "Name of Content" stores a text data set indicating a name of a content data set to be distributed, a title of movie to be watched, etc. The data field "Period of Validity" indicates a period during which the service user can receive the content data set, watch the movie, etc.

According to the advance ticket selling system, it is possible, for example, for the service user to purchase a right to receive a certain content data set for one months starting from 10 days later in a case, for example, that the service user operates terminal device 21 to access the content distribution server device, and inputs a name of content, a period of time within which to receive the content, and a payment method. In response to the input of data, the content distribution server device transmits to management server device 12 a request for a two-dimensional bar code, and in response to the request, management server device 12 transmits to the content distribution server device a two-dimensional bar code that indicates the company ID and the service ID that identify the contents to be distributed, the name of content, the period of validity, an amount to be paid, and the method of payment (more concretely, an instruction of usage of reward points for making the payment, a payment ID identifying the payment method, etc.). The content distribution server device receives the two-dimensional bar code from management server device 12, and transmits the two-dimensional bar code to terminal device 21. Then, terminal device 21 displays the two-dimensional bar code.

The service user scans the two-dimensional bar code using mobile phone 11, and mobile phone 11 transmits to management server device 12 the terminal ID and an item attribute data set containing data indicated by the two-dimensional bar code. Then, management server device 12 executes the processes for settling payment. After management server device 12 completes the settlement of payment, management server device 12 adds a new data record to the rights database in accordance with the data received from mobile phone 11.

After the new data record is registered to the rights database, the service user operates terminal device 21, which is not necessarily the same device as terminal device 21 that the service user used for purchasing the right, to access the content distribution server device, and selects a name of content that has been already purchased by the service user and that is valid. In response to the selection, the content distribution server device obtains a two-dimensional bar code from management server device 12, and the two-dimensional bar code is displayed by terminal device 21. When the service user scans the two-dimensional bar code by use of mobile phone 11, the terminal ID and the item attribute data set are transmitted to management server device 12. Management server device 12 retrieves from the rights database a data record containing the received terminal ID, the company ID contained in the received item attribute data set, and the service ID contained in the received item attribute data set. If the data field "Period of Validity" contains data indicating a period covering the current time, management server device 12 transmits to the content distribution server device an instruction of distribution of content data set without executing processes for settling payment.

According to the advance ticket selling system, a right that was purchased by a service user may be handed over to another service user. It is assumed, in the following example, that service user A who uses mobile phone 11a has purchased a right to watch a certain movie in the advance ticket selling system. When service user A wishes to hand over his/her right to watch the movie to service user B, who uses mobile phone 11b, service user A operates mobile phone 11a to access management server device 12, and requests a list of names of movies that service user A has purchased. In response to the request, management server device 12 retrieves from the rights database data record containing the terminal ID of mobile phone 11a, and transmits to mobile phone 11a a list of names of contents indicated by the data stored in the data field "Name of Content" of the retrieved data records.

Service user A selects the name of a movie that s/he wishes to hand over from the list of names of movies purchased (that have not been watched yet) displayed in mobile phone 11a.

Mobile phone 11a transmits to management server device 12 a request for a two-dimensional bar code for handing over the right. In response to the request, management server device 12 transmits to mobile phone 11a the two-dimensional bar code for handing over the right, and mobile phone 11a displays the two-dimensional bar code. The two-dimensional bar code indicates an item attribute data set containing the company ID and the service ID that indicate the movie to be handed over, and the terminal ID of mobile phone 11a.

Service user B scans the two-dimensional bar code displayed in mobile phone 11a by use of mobile phone 11b. Mobile phone 11b transmits the terminal ID of mobile phone 11b and the item attribute data set obtained from the two-dimensional bar code to management server device 12. Management server device 12 retrieves from the rights database a data record containing the terminal ID of mobile phone 11a, the company ID and the service ID contained in the item attribute data set received from mobile phone 11b. Then, management server device 12 overwrites the data stored in the data field "Terminal ID" of the retrieved data record with the terminal ID of mobile phone 11b that was received from mobile phone 11b, together with the item attribute data set. As a result, the right of watching the movie is handed over from service user A to service user B.

After the above-described processes are completed, when service user B attends a movie theater during the period of validity, and scans a two-dimensional bar code indicating the company ID and the service ID of the movie displayed at the entrance of a movie theater by use of mobile phone 11b. Mobile phone 11b transmits the terminal ID of mobile phone 11b, the company and the service ID obtained from the two-dimensional bar code to management server device 12, and management server device 12 checks whether the service user of mobile phone 11b has a right to watch the movie based on a data record retrieved from the rights database for mobile phone 11b. Then, the user is admitted after management server device 12 confirms that the service user of mobile phone 11b owns the right.

A data record stored in the rights database is deleted when its period of validity becomes out-of-date, or after the right is used if it is allowed to be used only once.

The data structure of the rights database described above is merely an example, and any other structure of database can be adopted to realize the same system. For example, the user database (see FIG. 2(a)) may have data fields for storing data sets indicating rights to use contents so that the user database also can be used as the rights database. Moreover, for example, the rights database (see FIG. 11) may have a data field for storing flag data indicating whether a right is valid or invalid, and when a right becomes out-of-date, the flag data may be changed to indicate that the right is invalid, instead of deleting the data record.

2.1.3. Third Modification

According to payment system 2 described above, an amount to be paid for a commodity or service is settled by a company that provides a settlement service. Instead of using such a company for settling the payment, the service user may settle payments for commodities, services, contents, etc., by use of reward points that are awarded to or purchased by the service user.

The service user can obtain reward points in several ways. For example, the service user can obtain reward points when s/he browses advertising leaflet 13 or pays a purchase amount at a participating shop. When the service user cannot obtain enough reward points for purchasing commodities or services that s/he wishes to purchase, the service user can purchase reward points by use of terminal device 21 via a Web page that is provided by management server device 12.

In this case, the same flow of processes as shown in FIG. 10 is executed by the system, though management server device 12 takes the role of EC-site server device 23. Namely, the service user can purchase reward points by inputting a number of reward points to be purchased and selecting a payment method in a Web page for purchasing reward points that is provided by management server device 12 in the same way that the service user purchases a commodity or service using the EC-site that is provided by EC-site server device 23. In accordance with the data input by the service user, management server device 12 generates a two-dimensional bar code and transmits to terminal device 21 page data for enabling terminal device 21 to display the two-dimensional bar code.

The service user can make an order of purchase of reward points to management server device 12 by scanning the two-dimensional bar code displayed by terminal device 21 by use of mobile phone 11. When management server device 12 receives a payment completion notice from payment server device 22 on the purchase of reward points, management server device 12 changes the data stored in the data field "Reward Points" of the data record of the service user retrieved from the user database so that the data indicates a number of reward points after the purchased reward points are added.

When the service user purchases a commodity or service using the EC-site and makes payment by using his/her reward points, the processes shown in FIG. 10 are executed by the system, though management server device 12 takes the role of payment server device 22. Namely, in a case where the service user selects "To use reward points by use of mobile phone" as a payment method in the Web page of EC-site, management server device 12 deducts the number of remaining reward points in accordance with the amount to be paid instead of requesting payment server device 22 to settle the payment, when management server device 12 receives the terminal ID and the item attribute data set from mobile phone 11. Then, management server device 12 notifies EC-site server device 23 of the completion of payment.

3. Modification

The above-explained example and its modifications may be variously modified within the scope of technical thought of the present invention. The following are examples of such modifications.

According to the above-described example, a two-dimensional bar code shot by a mobile phone is decoded by the mobile phone. The present invention is not limited at this point, and the mobile phone may transmit an image data set indicating the image of a two-dimensional bar code to management server device 12 without decoding the two-dimensional bar code together with the terminal ID of the mobile phone, and management server device 12 may decode the two-dimensional bar code received from the mobile phone.

According to the above-described example, a two-dimensional bar code shot by a mobile phone is decoded in accordance with instructions generated by the application program for the mobile phone. The present invention is not limited at this point, and when the mobile phone has a hardware unit for decoding two-dimensional bar codes, the hardware unit may decode the two-dimensional bar code shot by the mobile phone.

According to the above-described example, an item attribute data set is held by a medium such as a sheet of paper or a display unit in a form of a two-dimensional bar code. The present invention is not limited at this point, and the item attribute data set may be held by the medium as an image other than a two-dimensional bar code. Moreover, the item attribute data set may be held by a medium in a form other than that of an image. For example, a terminal device having a speaker may function as a medium holding the item attribute data set in a form of sound data. In the case, the terminal device may emit the sound indicating the item attribute data set, and the mobile phone may pick up the sound via its microphone to obtain the item attribute data set.

A magnetic card may be also used as a medium holding the item attribute data set. In the case, the magnetic card may store the item attribute data set as magnetic signals, and a magnetic card reader connected to a mobile phone may read out the magnetic signals stored in the magnetic card to obtain the item attribute data set. Any other type of signals such as radio signals, electric signals and optical signals may be used for indicating the item attribute data set in the present invention as long as the signals can be held by a medium and transmitted directly from the medium to a terminal device used by the service user.

According to the above-described example, the service user reads the two-dimensional bar code by use of his/her mobile phone, but the service user may use any device other than a mobile phone for reading out the item attribute data set from the medium as long as the device can transmit the item attribute data set read out from the medium to management server device 12 via a network.

Some of the functions of management server device 12 in the above-described example may be performed by another device of the system such as payment server device 22, EC-site server device 23 and the content distribution server device according to the modification of the second example. For example, the log database may be stored and managed by EC-site server device 23 or the content distribution server device instead of management server device 12.

Some or all of the functions of payment server device 22, EC-site server device 23 or the content distribution server device of the modification of the second example may be performed by management server device 12. For example, some of functions of the content distribution server device other than the function of content distribution, such as a function of a Web server providing Web pages for the service user to purchase content, may be performed by management server device 12, and management server device 12 may request the content distribution server device to distribute the contents after completion of payment for the contents.

According to the above-described example, the mobile phone, the terminal device and the server devices of the system are realized by having general-purpose computers execute processes in accordance with application programs for the devices. These devices may also be realized by combining hardware units, each of which provides each of the functions of the devices.

Any concrete data such as numeric data and any concrete data structure of databases used for explaining the examples and their modifications are only provided for the purpose of explanation, and the present invention is not limited by such concrete data or data structures. For example, any database having a data structure that is different from the data structure described in the foregoing explanation may be used in the present invention as long as the database can store the data used in the system.

Each device of the system according to the present invention may be realized by a single device, or by a group of devices working cooperatively.

The invention claimed is:

1. A system comprising:
a medium, a terminal device, and a server device,
wherein
the medium holds an item attribute data set indicating one or more attributes of an item and identifying the item,
the terminal device has:
a receiving unit that receives from the server device a terminal identification data set identifying the terminal device,
a storing unit that stores the terminal identification data set received by the receiving unit,
an obtaining unit that obtains from the medium the item attribute data set held by the medium, and
a transmitting unit that transmits to the server device the terminal identification data set stored by the storing unit and the item attribute data set obtained by the obtaining unit, and
the server device has:
a receiving unit that receives the terminal identification data set and the item attribute data set transmitted from the terminal device,
a storing unit that stores the terminal identification data set and the item attribute data set received by the receiving unit in association with each other, and
a transmitting unit that transmits to the terminal device the terminal identification data set identifying the terminal device,
the transmitting unit of the server device transmits to a first device the terminal identification data set and at least a part of the item attribute data set received by the receiving unit, or a data set generated from the terminal identification data set and at least a part of the item attribute data set received by the receiving unit,
the receiving unit of the server device receives a response data set transmitted from the first device in response to the transmission of data made by the transmitting unit of the server device, and
the transmitting unit of the server device transmits a predetermined data set corresponding to the response data set received by the receiving unit of the server device to a second device that is different from the first device.

2. The system according to claim 1, wherein:
the medium is a device that has a receiving unit receiving data from the server device, and
the first device is the medium.

3. The system according to claim 1, wherein:
the medium is a device that has a receiving unit receiving data from the server device, and
the second device is the medium.

4. The system according to claim 1, wherein:
the item attribute data set contains a device identification data set identifying the first device, and
the transmitting unit of the server device transmits data to the first device identified by the device identification data set contained in the item attribute data set.

5. The system according to claim 1, wherein:
the item attribute data set contains a device identification data set identifying the second device, and
the transmitting unit of the server device transmits data to the second device identified by the device identification data set contained in the item attribute data set.

6. The system according to claim 1, wherein:
the first device is the terminal device.

7. The system according to claim 1, wherein:
the second device is the terminal device.

8. A system comprising:
a medium, a terminal device, and a server device,
wherein
the medium holds an item attribute data set indicating one or more attributes of an item and identifying the item,
the terminal device has:
a receiving unit that receives from the server device a terminal identification data set identifying the terminal device,
a storing unit that stores the terminal identification data set received by the receiving unit,
an obtaining unit that obtains from the medium the item attribute data set held by the medium, and
a transmitting unit that transmits to the server device the terminal identification data set stored by the storing unit and the item attribute data set obtained by the obtaining unit, and
the server device has:
a receiving unit that receives the terminal identification data set and the item attribute data set transmitted from the terminal device,
a storing unit that stores the terminal identification data set and the item attribute data set received by the receiving unit in association with each other, and
a transmitting unit that transmits to the terminal device the terminal identification data set identifying the terminal device,
the transmitting unit of the server device transmits to a first device the terminal identification data set and at least a part of the item attribute data set received by the receiving unit, or a data set generated from the terminal identification data set and at least a part of the item attribute data set received by the receiving unit,
the storing unit of the server device stores a point data set with respect to each of terminal identification data sets received by the receiving unit of the server device, the point data set indicating a number of points, and
the server device has a point changing unit that causes the storing unit of the server device to change the point data set with respect to the terminal device, when the receiving unit of the server device receives the terminal identification data set and the item attribute data set from the terminal device, so that the point data set with respect to the terminal device indicates an adjusted number of points, increased or decreased in accordance with the item attribute data set.

9. A system comprising:
a medium, a terminal device, and a server device,
wherein
the medium holds an item attribute data set indicating one or more attributes of an item and identifying the item,
the terminal device has:
a receiving unit that receives from the server device a terminal identification data set identifying the terminal device,
a storing unit that stores the terminal identification data set received by the receiving unit,
an obtaining unit that obtains from the medium the item attribute data set held by the medium, and
a transmitting unit that transmits to the server device the terminal identification data set stored by the storing unit and the item attribute data set obtained by the obtaining unit, and
the server device has:
a receiving unit that receives the terminal identification data set and the item attribute data set transmitted from the terminal device, a storing unit that stores the terminal identification data set and the item attribute data set received by the receiving unit in association with each other, and a transmitting unit that transmits to the terminal device the terminal identification data set identifying the terminal device, the transmitting unit of the server device transmits to a first device the terminal identification data set and at least a part of the item attribute data set received by the receiving unit, or a data set generated from the terminal identification data set and at least a part of the item attribute data set received by the receiving unit, the storing unit of the server device stores a condition data set indicating a condition applied to the item attribute data set, the server device has a determining unit that determines, when the receiving unit of the server device receives the terminal identification data set and the item attribute data set from the terminal device, whether the item attribute data set meets the condition indicated by the condition data set stored by the storing unit of the server device, and the transmitting unit of the server device transmits data to the first device only when the determining unit of the server device determines that the item attribute data set meets the condition.

10. The system according to claim 9, wherein:
the storing unit of the server device stores the condition data set indicating a condition applied to the item attribute data set received previously by the receiving unit of the server device and stored in the storing unit of the server device.

11. A system comprising:
a medium, a terminal device, and a server device,
wherein
the medium holds an item attribute data set indicating one or more attributes of an item and identifying the item,
the terminal device has:
a receiving unit that receives from the server device a terminal identification data set identifying the terminal device,
a storing unit that stores the terminal identification data set received by the receiving unit,
an obtaining unit that obtains from the medium the item attribute data set held by the medium, and
a transmitting unit that transmits to the server device the terminal identification data set stored by the storing unit and the item attribute data set obtained by the obtaining unit, and
the server device has:
a receiving unit that receives the terminal identification data set and the item attribute data set transmitted from the terminal device,
a storing unit that stores the terminal identification data set and the item attribute data set received by the receiving unit in association with each other, and
a transmitting unit that transmits to the terminal device the terminal identification data set identifying the terminal device,
the transmitting unit of the server device transmits to a first device the terminal identification data set and at least a part of the item attribute data set received by the receiving unit, or a data set generated from the terminal identification data set and at least a part of the item attribute data set received by the receiving unit, the medium is a medium on which an image indicating the item attribute data set is formed, or a device that displays an image indicating the item attribute data set, and
the obtaining unit of the terminal device optically reads the image shown by the medium to obtain the item attribute data set.

12. A system comprising:
a medium, a terminal device, and a server device,
wherein
the medium holds an item attribute data set indicating one or more attributes of an item and identifying the item,
the terminal device has:
a receiving unit that receives from the server device a terminal identification data set identifying the terminal device,
a storing unit that stores the terminal identification data set received by the receiving unit,
an obtaining unit that obtains from the medium the item attribute data set held by the medium, and
a transmitting unit that transmits to the server device the terminal identification data set stored by the storing unit and the item attribute data set obtained by the obtaining unit, and
the server device has:
a receiving unit that receives the terminal identification data set and the item attribute data set transmitted from the terminal device,
a storing unit that stores the terminal identification data set and the item attribute data set received by the receiving unit in association with each other, and
a transmitting unit that transmits to the terminal device the terminal identification data set identifying the terminal device,
the transmitting unit of the server device transmits to a first device the terminal identification data set and at least a part of the item attribute data set received by the receiving unit, or a data set generated from the terminal identification data set and at least a part of the item attribute data set received by the receiving unit,
the medium transmits any one of sound signals, radio signals, electric signals, optical signals and magnetic signals indicating the item attribute data set, and
the obtaining unit of the terminal device receives the any one of sound signals, radio signals, electric signals, optical signals and magnetic signals directly from the medium to obtain the item attribute data set.

13. The system according to claim 1, wherein:
the server device has a code generating unit that generates a code indicating the item attribute data set in a form of an image or signals, and
the medium holds the item attribute data set in a form of the image or the signals generated by the code generating unit of the server device.

14. A system comprising:
a medium, a terminal device, and a server device,
wherein
the medium holds an item attribute data set indicating one or more attributes of an item and identifying the item,
the terminal device has:
a receiving unit that receives from the server device a terminal identification data set identifying the terminal device,
a storing unit that stores the terminal identification data set received by the receiving unit,
an obtaining unit that obtains from the medium the item attribute data set held by the medium, and a transmitting unit that transmits to the server device the terminal identification data set stored by the storing unit and the item attribute data set obtained by the obtaining unit, and the server device has:

a receiving unit that receives the terminal identification data set and the item attribute data set transmitted from the terminal device, a storing unit that stores the terminal identification data set and the item attribute data set received by the receiving unit in association with each other, and a transmitting unit that transmits to the terminal device the terminal identification data set identifying the terminal device, the transmitting unit of the server device transmits to a first device the terminal identification data set and at least a part of the item attribute data set received by the receiving unit, or a data set generated from the terminal identification data set and at least a part of the item attribute data set received by the receiving unit, the server device has a code generating unit that generates a code indicating the item attribute data set in a form of an image or signals, the medium holds the item attribute data set in a form of the image or the signals generated by the code generating unit of the server device, the receiving unit of the server device receives a code request from the first device, the code generating unit of the server device generates the code in response to the code request received by the receiving unit of the server device, the transmitting unit of the server device transmits the code generated by the code generating unit of the server device to the first device, and the medium is a device that has a code receiving unit receiving the code from the first device.

15. A system comprising:

a medium, a terminal device, and a server device, wherein the medium holds an item attribute data set indicating one or more attributes of an item and identifying the item, the terminal device has:

a receiving unit that receives from the server device a terminal identification data set identifying the terminal device, a storing unit that stores the terminal identification data set received by the receiving unit, an obtaining unit that obtains from the medium the item attribute data set held by the medium, and a transmitting unit that transmits to the server device the terminal identification data set stored by the storing unit and the item attribute data set obtained by the obtaining unit, and the server device has:

a receiving unit that receives the terminal identification data set and the item attribute data set transmitted from the terminal device, a storing unit that stores the terminal identification data set and the item attribute data set received by the receiving unit in association with each other, and a transmitting unit that transmits to the terminal device the terminal identification data set identifying the terminal device, the transmitting unit of the server device transmits to a first device the terminal identification data set and at least a part of the item attribute data set received by the receiving unit, or a data set generated from the terminal identification data set and at least a part of the item attribute data set received by the receiving unit, the server device has a code generating unit that generates a code indicating the item attribute data set in a form of an image or signals, the medium holds the item attribute data set in a form of the image or the signals generated by the code generating unit of the server device, the medium is a device that has a code receiving unit receiving the code from the server device, and the transmitting unit of the server device transmits the code generated by the code generating unit to the medium.

16. A system comprising:

a medium, a terminal device, and a server device, wherein the medium holds an item attribute data set indicating one or more attributes of an item and identifying the item, the terminal device has:

a receiving unit that receives from the server device a terminal identification data set identifying the terminal device, a storing unit that stores the terminal identification data set received by the receiving unit, an obtaining unit that obtains from the medium the item attribute data set held by the medium, and a transmitting unit that transmits to the server device the terminal identification data set stored by the storing unit and the item attribute data set obtained by the obtaining unit, and the server device has:

a receiving unit that receives the terminal identification data set and the item attribute data set transmitted from the terminal device, a storing unit that stores the terminal identification data set and the item attribute data set received by the receiving unit in association with each other, and a transmitting unit that transmits to the terminal device the terminal identification data set identifying the terminal device, the transmitting unit of the server device transmits to a first device the terminal identification data set and at least a part of the item attribute data set received by the receiving unit, or a data set generated from the terminal identification data set and at least a part of the item attribute data set received by the receiving unit, the storing unit of the server device stores an authentication data set for each terminal identification data set that may be received by the receiving unit of the server device, the authentication data set being used for authenticating a user of a terminal device identified by the terminal identification data set corresponding to the authentication data set, the receiving unit of the server device receives from an arbitrary device an authentication data set for authenticating a user of the arbitrary device, the server device has a terminal identification changing unit that, when the authentication data set received by the receiving unit of the server device is verified to correspond to one of the authentication data sets stored by the storing unit of the server device, and when the terminal identification data set stored with respect to the verified authentication data set by the storing unit of the server device is named as a first terminal identification data set, assigns to the first terminal identification data set a second terminal identification data set that is different from the first terminal identification data set, and instructs the storing unit of the server device to store data that was stored in association with the first terminal identification data set in association with the second terminal identification data set, and the transmitting unit of the server device transmits the second terminal identification data set to the arbitrary device, when the terminal identification changing unit so instructs.

17. A server device comprising:

a receiving unit that receives from a terminal device a terminal identification data set identifying the terminal device and an item attribute data set indicating one or more attributes of an item and identifying the item, a storing unit that stores the terminal identification data set and the item attribute data set received by the receiving unit in association with each other, and a transmitting unit that transmits the terminal identification data set identifying the terminal device to the terminal device, and transmits to a first device the terminal identification data set and at least a part of the item attribute data set received by the receiving unit or transmits to the first device a data set generated from the terminal identification data set and at least a part of the item attribute data set received by the receiving unit, the receiving unit receives a response data set transmitted from the first device in response to the transmission of data made by the transmitting unit, and the transmitting unit transmits a predetermined data set corresponding to the response data set received by the receiving unit to a second device that is different from the first device.

18. The server device according to claim 17, wherein:

the transmitting unit transmits data to the first device that provides the terminal device with the item attribute data set.

19. The server device according to claim 17, wherein:

the transmitting unit transmits data to the second device that provides the terminal device with the item attribute data set.

20. The server device according to claim 17, wherein:

the receiving unit receives the item attribute data set containing a device identification data set identifying the first device, and the transmitting unit transmits data to the first device identified by the device identification data set contained in the item attribute data set.

21. The server device according to claim 17, wherein:

the receiving unit receives the item attribute data set containing a device identification data set identifying the second device, and the transmitting unit transmits data to the second device identified by the device identification data set contained in the item attribute data set.

22. The server device according to claim 17, wherein:

the first device is the terminal device, and the transmitting unit transmits data to the terminal device as the first device.

23. The server device according to claim 17, wherein:

the second device is the terminal device, and the transmitting unit transmits data to the terminal device as the second device.

24. A server device comprising:

a receiving unit that receives from a terminal device a terminal identification data set identifying the terminal device and an item attribute data set indicating one or more attributes of an item and identifying the item, a storing unit that stores the terminal identification data set and the item attribute data set received by the receiving unit in association with each other, and a transmitting unit that transmits the terminal identification data set identifying the terminal device to the terminal device, and transmits to a first device the terminal identification data set and at least a part of the item attribute data set received by the receiving unit or transmits to the first device a data set generated from the terminal identification data set and at least a part of the item attribute data set received by the receiving unit, the storing unit stores a point data set in respect to each of terminal identification data sets that may be received by the receiving unit, the point data set indicating a number of points, and the server device has a point changing unit that causes the storing unit to change the point data set with respect to the terminal device, when the receiving unit receives the terminal identification data set and the item attribute data set from the terminal device, so that the point data set with respect to the terminal device indicates a new number of points adjusted in accordance with the item attribute data set.

25. A server device comprising:

a receiving unit that receives from a terminal device a terminal identification data set identifying the terminal device and an item attribute data set indicating one or more attributes of an item and identifying the item, a storing unit that stores the terminal identification data set and the item attribute data set received by the receiving unit in association with each other, and a transmitting unit that transmits the terminal identification data set identifying the terminal device to the terminal device, and transmits to a first device the terminal identification data set and at least a part of the item attribute data set received by the receiving unit or transmits to the first device a data set generated from the terminal identification data set and at least a part of the item attribute data set received by the receiving unit, the storing unit stores a condition data set indicating a condition applied to the item attribute data set, the server device has a determining unit that determines, when the receiving unit receives the terminal identification data set and the item attribute data set from the terminal device, whether the item attribute data set meets the condition indicated by the condition data set stored by the storing unit, and the transmitting unit transmits data to the first device only when the determining unit determines that the item attribute data set meets the condition.

26. The server device according to claim 25, wherein:

the storing unit stores the condition data set indicating a condition applied to the item attribute data set received already by the receiving unit and stored by the storing unit.

27. The server device according to claim 17, wherein:

the server device has a code generating unit that generates a code indicating the item attribute data set in a form of an image or signals, and the transmitting unit transmits the code generated by the code generating unit to the medium, which is a device.

28. A server device comprising:

a receiving unit that receives from a terminal device a terminal identification data set identifying the terminal device and an item attribute data set indicating one or more attributes of an item and identifying the item, a storing unit that stores the terminal identification data set and the item attribute data set received by the receiving unit in association with each other, and a transmitting unit that transmits the terminal identification data set identifying the terminal device to the terminal device, and transmits to a first device the terminal identification data set and at least a part of the item attribute data set received by the receiving unit or transmits to the first device a data set generated from the terminal identification data set and at least a part of the item attribute data set received by the receiving unit, the server device has a code generating unit that generates a code indicating the item attribute data set in a form of an image or signals, the transmitting unit transmits the code generated by the code generating unit to the medium, which is a device, the receiving unit receives a code request from the first device, the code generating unit generates a code in response to the code request received by the receiving unit, and the transmitting unit transmits the code generated by the code generating unit to the first device.

29. The server device according to claim 27, wherein:
the transmitting unit transmits the code generated by the code generating unit to the medium.

30. A server device comprising:

a receiving unit that receives from a terminal device a terminal identification data set identifying the terminal device and an item attribute data set indicating one or more attributes of an item and identifying the item, a storing unit that stores the terminal identification data set and the item attribute data set received by the receiving unit in association with each other, and a transmitting unit that transmits the terminal identification data set identifying the terminal device to the terminal device, and transmits to a first device the terminal identification data set and at least a part of the item attribute data set received by the receiving unit or transmits to the first device a data set generated from the terminal identification data set and at least a part of the item attribute data set received by the receiving unit, the storing unit stores an authentication data set with respect to each of terminal identification data sets received by the receiving unit, the authentication data set is used for authenticating a user of a terminal device identified by the terminal identification data set corresponding to the authentication data set, the receiving unit receives from an arbitrary device an authentication data set for authenticating a user of the arbitrary device, the server device has a terminal identification changing unit that, when the authentication data set received by the receiving unit is successfully verified with one of the authentication data sets stored by the storing unit, and when the terminal identification data set stored with respect to the verified authentication data set by the storing unit is named as a first terminal identification data set, assigns a second terminal identification data set to the first terminal identification data set that is different from the first terminal identification data set, and instructs the storing unit to store data that was stored in association with the first terminal identification data set in association with the second terminal identification data set, and the transmitting unit transmits the second terminal identification data set to the arbitrary device, when the terminal identification changing unit so instructs.

\* \* \* \* \*